(12) United States Patent
Sicconi et al.

(10) Patent No.: US 11,249,544 B2
(45) Date of Patent: Feb. 15, 2022

(54) METHODS AND SYSTEMS FOR USING ARTIFICIAL INTELLIGENCE TO EVALUATE, CORRECT, AND MONITOR USER ATTENTIVENESS

(71) Applicant: TeleLingo, Purdys, NY (US)

(72) Inventors: Roberto Sicconi, Purdys, NY (US); Malgorzata Stys, Purdys, NY (US); Tim Chinenov, Glen Head, NY (US)

(73) Assignee: TELELINGO, Purdys, NY (US)

( * ) Notice: Subject to any disclaimer, the term of this patent is extended or adjusted under 35 U.S.C. 154(b) by 155 days.

(21) Appl. No.: 16/590,264

(22) Filed: Oct. 1, 2019

(65) Prior Publication Data

US 2020/0057487 A1   Feb. 20, 2020

Related U.S. Application Data

(63) Continuation-in-part of application No. 15/820,411, filed on Nov. 21, 2017, now Pat. No. 10,467,488.

(Continued)

(51) Int. Cl.
| | |
|---|---|
| *G06F 3/01* | (2006.01) |
| *G06F 9/54* | (2006.01) |
| *G06T 7/246* | (2017.01) |
| *G06T 7/11* | (2017.01) |
| *G06T 7/174* | (2017.01) |

(Continued)

(52) U.S. Cl.
CPC .............. *G06F 3/011* (2013.01); *G06F 3/017* (2013.01); *G06F 9/542* (2013.01); *G06N 20/00* (2019.01); *G06T 7/11* (2017.01); *G06T 7/136* (2017.01); *G06T 7/174* (2017.01); *G06T 7/248* (2017.01); *G08B 3/1016* (2013.01); *G08B 5/223* (2013.01); *G06T 2207/20021* (2013.01)

(58) Field of Classification Search
CPC . G06T 7/174; G06T 7/11; G06T 7/136; G06T 7/248; G06T 7/254; G06T 2207/20021; G06N 20/00; G08B 5/223; G08B 3/1016; G08B 21/06; G06F 3/017; G06F 3/011; G06F 9/542; G06K 9/00845
See application file for complete search history.

(56) References Cited

U.S. PATENT DOCUMENTS

| | | | |
|---|---|---|---|
| 2015/0339589 A1* | 11/2015 | Fisher | B25J 9/16 706/12 |
| 2016/0068160 A1* | 3/2016 | Schofield | G06K 9/00825 701/70 |
| 2017/0247031 A1* | 8/2017 | Feit | B60W 30/12 |

* cited by examiner

*Primary Examiner* — Brenda C Bernardi
(74) *Attorney, Agent, or Firm* — Caldwell Intellectual Property Law, LLC

(57) ABSTRACT

In an aspect, a system for using artificial intelligence to evaluate, correct, and monitor user attentiveness includes a forward-facing camera, the forward-facing camera configured to capture a video feed of a field of vision on a digital screen, at least a user alert mechanism configured to output a directional alert to a user, a processing unit in communication with the forward-facing camera and the at least a user alert mechanism, a screen location to spatial location map operating on the processing unit, and a motion detection analyzer operating on the processing unit, the motion detection analyzer designed and configured to detect, on the digital screen, a rapid parameter change, determine a screen location on the digital screen of the rapid parameter change, retrieve, from the screen location to spatial location map, a spatial location based on the screen location, and generate, using the spatial location, the directional alert.

20 Claims, 23 Drawing Sheets

Related U.S. Application Data

(60) Provisional application No. 62/424,612, filed on Nov. 21, 2016.

(51) Int. Cl.
*G06N 20/00* (2019.01)
*G08B 3/10* (2006.01)
*G08B 5/22* (2006.01)
*G06T 7/136* (2017.01)

METHODS AND SYSTEMS FOR USING ARTIFICIAL INTELLIGENCE TO EVALUATE, CORRECT, AND MONITOR USER ATTENTIVENESS

CROSS-REFERENCE TO RELATED APPLICATIONS

This application is a continuation-in-part of U.S. Non-provisional application Ser. No. 15/820,411, filed on Nov. 21, 2017 and entitled "METHOD TO ANALYZE ATTENTION MARGIN AND TO PREVENT INATTENTIVE AND UNSAFE DRIVING," which claims the benefit of priority of U.S. Provisional Patent Application Ser. No. 62/424,612, filed on Nov. 21, 2016, and entitled "METHOD TO ANALYZE ATTENTION MARGIN AND TO PREVENT INATTENTIVE AND UNSAFE DRIVING." Each of Non-provisional application Ser. No. 15/820,411 and U.S. Provisional Patent Application Ser. No. 62/424,612 is incorporated by reference herein in its entirety.

FIELD OF THE INVENTION

The present invention generally relates to the field of artificial intelligence. In particular, the present invention is directed to methods and systems for using artificial intelligence to evaluate, correct, and monitor user attentiveness.

BACKGROUND

Car accidents in the US are on the rise after a decade of slow but steady declines. Although safer cars and improved driving assist equipment help prevent accidents, distracted driving is more than offsetting all these benefits. State bans on the use of cell phones in cars seem not to work. Mobile apps that intercept distracting calls or the use of apps are easy to circumvent, and distractions can also come from sources other than phones. Current solutions monitor driving behavior by evaluating vehicle dynamics. Driving risk is correlated with speed, braking, cornering, without taking into account traffic, weather conditions, attention paid by the driver to events happening on the road, ability to control the vehicle in unexpected situations, proper physical and mental conditions. The vast majority of driving assist solutions ignore drivers' fatigue, stress, wellness, fitness, reaction capabilities to anticipate risks and adjust warning margins.

SUMMARY OF THE DISCLOSURE

In an aspect, a system for using artificial intelligence to evaluate, correct, and monitor user attentiveness includes a forward-facing camera, the forward-facing camera configured to capture a video feed of a field of vision on a digital screen. The system includes at least a user alert mechanism configured to output a directional alert to a user. The system includes a processing unit in communication with the forward-facing camera and the at least a user alert mechanism. The system includes a screen location to spatial location map operating on the processing unit. The system includes a motion detection analyzer operating on the processing unit, the motion detection analyzer designed and configured to detect, on the digital screen, a rapid parameter change, determine a screen location on the digital screen of the rapid parameter change, retrieve, from the screen location to spatial location map, a spatial location based on the screen location, and generate, using the spatial location, the directional alert.

In another aspect, a method of using artificial intelligence to evaluate, correct, and monitor user attentiveness. The method includes capturing, by a motion detection analyzer operating on a processing unit, using a forward-facing camera, a video feed of a field of vision on a digital screen. The method includes detecting, by the motion detection analyzer and on the digital screen, a rapid parameter change. The method includes determining, by the motion detection analyzer, a screen location on the digital screen of the rapid parameter change. The method includes retrieving, by the motion detection analyzer and from a screen location to spatial location map, a spatial location based on the screen location. The method includes generating, by the motion detection analyzer and using the spatial location, a directional alert. The method includes outputting, by the motion detection analyzer and using at least a user alert mechanism the directional alert.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
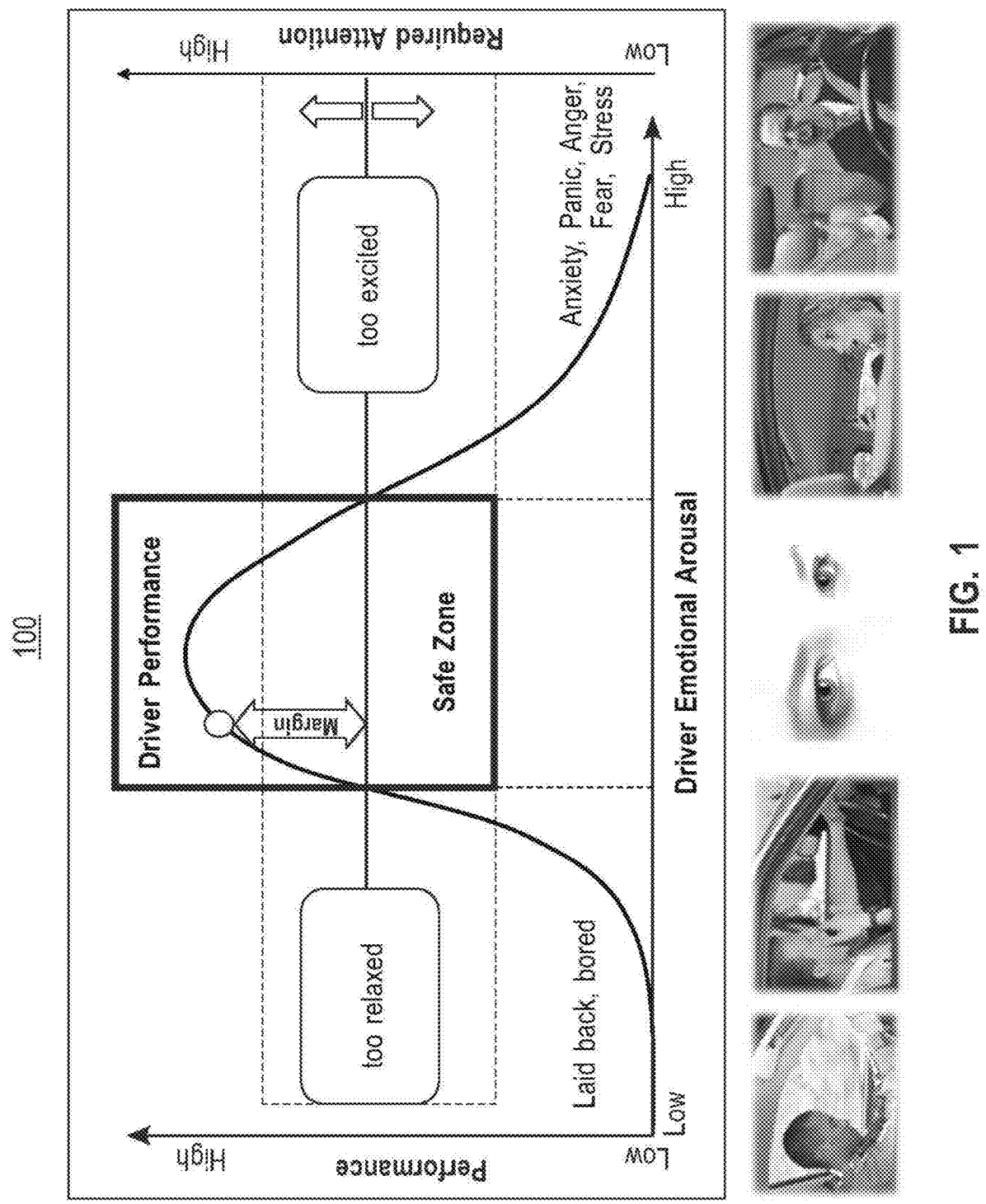
FIG. 1 shows a chart according to an embodiment of the present invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described herein include an intelligent driver attention monitoring system. Systems may mimic behavior of a dependable passenger who can evaluate the driving context risk (associated to the current speed, acceleration, breaking, cornering, pavement, weather and traffic conditions), then match it against the level of attention exhibited by the driver. If a driver looks away from the road for too long or too often, or the car is zigzagging in the lane, such a virtual passenger may warn the driver with specific signals or with spoken utterances. Embodiments may detect motion in video feeds, for instance where a user is not currently looking as determined by gaze tracking or the like, to generate a preliminary alert to sudden changes of motion in a manner analogous to and/or supplementing peripheral vision for a distracted and/or vision-impaired user.

Over the recent years, basic telematics services have been introduced to encourage safe driving via Usage Based Insurance (UBI) plans. Embodiments described in this disclosure may represent an evolution of UBI telematics systems by combining analytics of telematics data, driver observed behavior and performance, to compute driving risk scores. Embodiments of the present invention provide real time and personalized feedback to a driver to prevent dangerous situations caused by distraction in the first place.

In some embodiments, systems described herein may evaluate factors including without limitation (a) attentiveness of people while performing a task or communicating with another party such as a person or machine; (b) an estimated level of risk associated with a surrounding environment; and/or (c) a margin between a level of available attention and an attention level required by the task or communication. Such evaluation may be used, in some embodiments of systems described herein, to generate and/or provide useful feedback regarding behavior of a person being observed to that person. Evaluation may be used to generate and/or provide suggestions, to a person being observed, indicating how that person may change his or her behavior in order to reduce and/or minimize risk as determined according to embodiments presented in this disclosure. Artificial Intelligence (AI) may be used to convert observed patterns into behavior profiles, to refine them over multiple observations, and/or to create group statistics across similar situations. As an example, one application of embodiments of methods described herein may include driving risk profiling and prevention of accidents caused by distracted and drowsy driving; such methods may perform driving risk profiling and/or prevention of accidents using machine vision and/or AI to create a digital assistant with copilot expertise. All drivers may be able to benefit from innovations as set forth in this disclosure, including without limitation teenage drivers, elderly drivers, and/or drivers with chronic conditions. Fleet management companies, car insurance companies, ride sharing and rental car companies as well as healthcare providers may be able to take advantage of this invention to improve, fine tune, and/or personalize their services.

Embodiments presented herein may provide a platform for driver attention management and/or smart driver monitoring to address escalating problems of unsafe driving, covering an attention spectrum ranging from distracted driving to experiencing drowsiness on long, boring stretches of road. Mobile devices and their apps are not designed to be distraction-free. They ignore the stress level that the driver may be under, possibly requiring full attention at a split-second notice. At the same time, drivers who benefit from reduced cognitive load ensured by sophisticated driver assist may be more easily subject to drowsiness, another leading cause of fatal accidents.

Embodiments disclosed herein may further provide electronic driving record (EDR) implementation. With current logging driver information, known monitoring solutions do not support secure data access rights with high degrees of configuration flexibility provide real time feedback mechanisms, provide ability to suspend/revoke select access rights at any time, including while driving. In embodiments implementing EDR as disclosed herein, a driver may be able to reinstate access rights dynamically while driving or at the end of a trip, to identify and/or specify who gets to see what EDR data and/or when and how to create accurate driving behavior models support inclusion of sensors data (e.g. health-related) measure and log attention level of the driver. In contrast to current systems embodiments presented herein therefor may address privacy implications associated with UBI data gathering.

Now referring to FIG. 1, an exemplary graphical illustration 100 plotting driver performance against emotional arousal is presented; the illustration shows that driving performance peaks at "normal" conditions, as represented in the form of a "safe zone" a central portion of the illustration. As illustrated, fatigue and drowsiness may lead to reduced performance and ability to respond to challenging situations; similarly, excessive excitement, anxiety, anger, stress, fear, nervousness may lead to reduced ability to perform correct driving actions. A "driving risk" level, represented by a horizontal line running from the "too relaxed" label to the "too excited" label, moves up and down, sometimes very quickly, altering the attention "margin" of a driver. Embodiments of systems presented in this disclosure may constantly estimate a driver's attention margin; in some embodiments, system may provide feedback to the driver to allow him/her to adjust behavior and prevent dangerous situations. Graphical illustration 100 may describe in part a Yerkes-Dodson law, used by psychologists to relate performance to arousal; according to this exemplary illustration, humans may be expected to drive most effectively when they are in the depicted "Safe Zone", away from drowsiness and excessive excitements, and from distractions.

Figure 2:
FIG. 2 shows an exemplary implementation according to an embodiment of the present invention.
Figure 2:
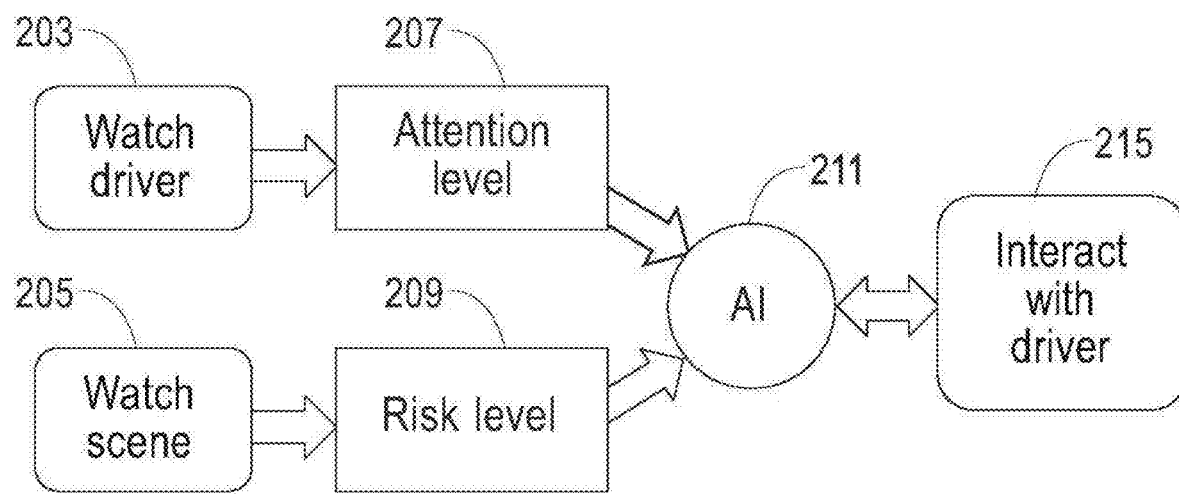

Now referring to FIG. 2, a process flow diagram 201 illustrates a plurality of input and/or analysis steps 203-209 that may be performed by an AI 211, including without limitation an AI as integrated in systems as described in further detail below, to implement processes as described in this disclosure, and at least an output step 215 that the AI 211 may perform as described in further detail below. As a general overview, and for illustrative purposes only, embodiments of AI 211 may perform in a manner analogous to a smart copilot or passenger that alerts a driver to hazards or items of interest or concern on a road ahead of the driver. AI may receive outside condition inputs 205 indicative of one or more conditions or phenomena occurring outside a vehicle operated by a driver, such as without limitation road conditions, weather, behavior of other drivers, pedestrians, bicyclists, and/or animals at or around the road and/or other region through which the vehicle and/or driver is navigating; AI may thus perform data collection analogous to "watching the scene" around and/or in front of a vehicle and/or driver. An embodiment of AI 211 and/or a system or device implementing AI may perform one or more determinations to assess a risk level 209 as a function of outside condition inputs 205, for instance using processes for risk level assessment as described elsewhere in this disclosure. AI 211 may similarly receive driver-related inputs 203 using one or more sensors or cameras that detect information concerning a driver according to any means or method described in this disclosure; for instance, and without limitation, an AI 211 receiving driver-related inputs 203 may be characterized as using such inputs to watch the driver. AI 211 may perform one or more analysis steps using driver-related inputs 203 to determine one or more facts about a driver's current or likely future performance, for instance as described elsewhere in this disclosure; as a non-limiting example, AI may determine an attention level 209 of the driver. AI 211 may combine the above input and/or analysis results with one or more elements of stored information, such as without limitation one or more elements of data describing and/or quantifying one or more aspects of the driver's skills. AI 211 may use inputs and/or analysis 203-209 and/or stored information to generate one or more outputs to driver; for instance, and without limitation, AI 211 may interact with driver 215 to inform the driver of results of input and/or analysis processes 203-209 and/or processes using and/or comparing stored information in or with such inputs and/or analysis 203-209. For instance, and without limitation, if or when AI 211 detects danger not being appropriately handled by the driver, AI 211 may use and/or be combined with machine-learning processes to adapt monitoring and reasoning to drivers' habits and preferences and to make the communications with the driver 215 as nonintrusive and effective as possible.

Figure 3:
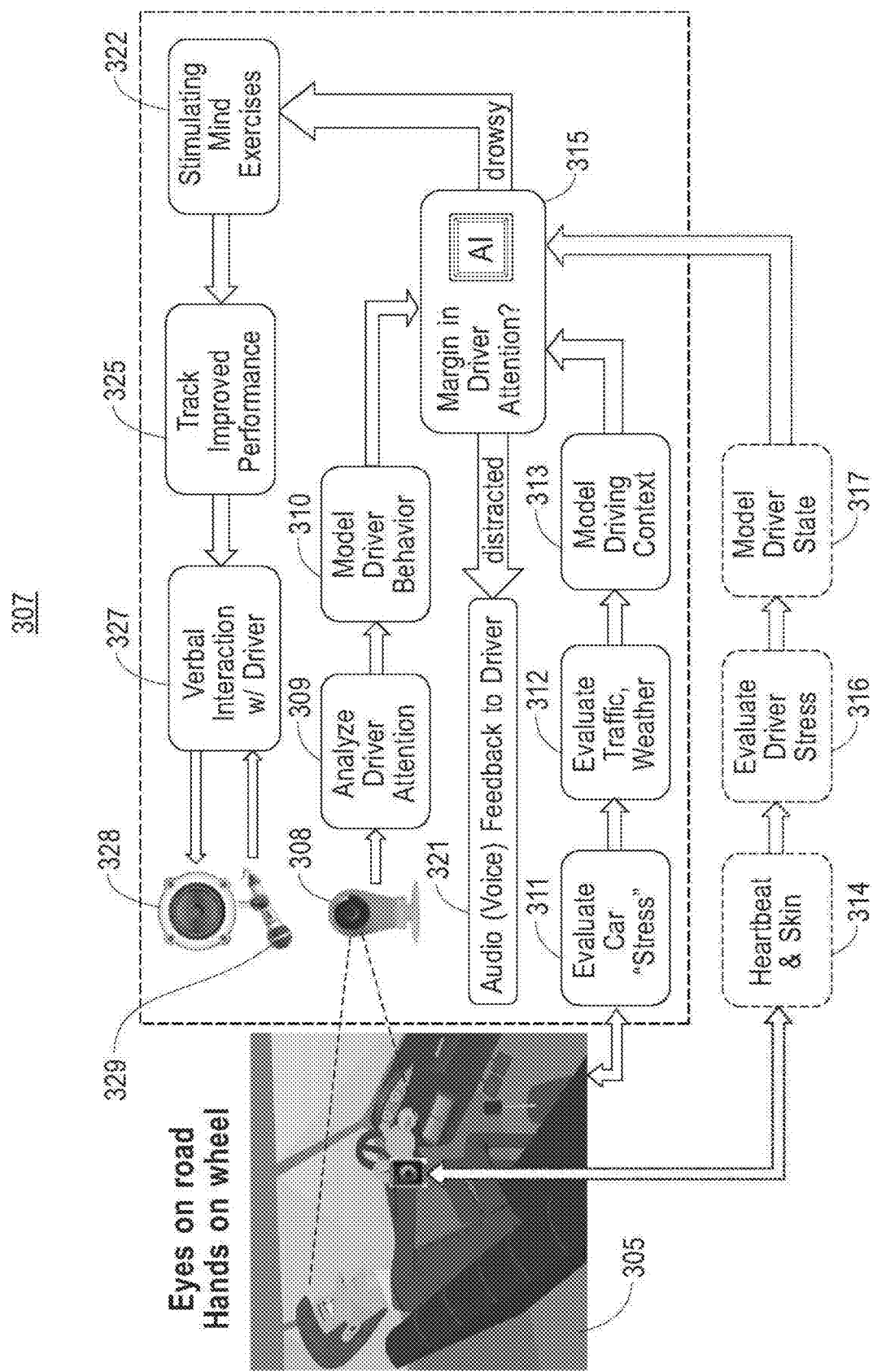
FIG. 3 shows another exemplary implementation according to an embodiment of the present invention.

Referring now to FIG. 3 an AI 211 as described above in reference to FIG. 2 may be implemented to perform one or more determinations regarding a driver 305 within a system 307, as a function of input and analytical steps and/or devices 308-313; AI 211 may be implemented on a processing unit 315. Processing unit 315 may include any computing device as described in this disclosure. Processing unit 315 may be any combination of computing devices as described in this disclosure. Processing unit 315 may be connected to a network as described in this disclosure; the network may be the Internet. Processing unit 315 may include, for instance, a first server or cluster of servers in a first location and a second server or cluster of servers in a second location. Processing unit 315 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Processing unit 315 may include one or more computing devices dedicated to data storage, security, distribution of traffic for load balancing, and the like. Processing unit 315 may distribute one or more computing tasks as described below across a plurality of computing devices of processing unit 315, which may operate in parallel, in series, redundantly, or in any other manner used for distribution of tasks or memory between computing devices. Processing unit 315 may be implemented using a "shared nothing" architecture in which data is cached at the worker; in an embodiment, this may enable scalability of system 100 and/or processing unit 315. As a non-limiting example, processing unit 315 may include a portable and/or mobile computing device such as without limitation a smartphone, tablet, laptop, or netbook; processing unit 315 may include a computing device integrated and/or mounted on or in a vehicle.

With continued reference to FIG. 3, processing unit 315 or any device usable as processing unit 315 as described in this disclosure, may be designed and/or configured to perform any method, method step, or sequence of method steps in any embodiment described in this disclosure, in any order and with any degree of repetition. For instance, processing unit 315 or any device usable as processing unit 315 as described in this disclosure, may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processing unit 315 or any device usable as processing unit 315 as described in this disclosure, may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 3, processing unit 315 may be in communication, via wired and/or wireless communication protocols, with one or more input devices configured to receive driver-related data; such input devices may include any input devices as described in this disclosure, including without limitation a camera 308 pointed at the driver. Camera 308 may include any device suitable for capturing optical images of a driver using light on or off the visible spectrum, including without limitation any camera or similar device as described in this disclosure. Processing unit 315 may receive and/or classify data describing driver 305 via camera 308; for instance and without limitation, data describing driver 305 data describing an orientation of a face and/or of eyes of the driver. Direction of driver's attention may be recorded and/or classified according to rotation angles (yaw, pitch, roll and eyes lateral movements) to analyze the a direction of driver's attention 309 (road ahead, left mirror, right mirror, central rearview mirror, instrument cluster, center dash, passenger seat, phone in hand, etc.); such data may be used to model driver behavior 310, for instance according to AI and/or machine/learning methods as described in this disclosure. Vehicular dynamics data, such as without limitation acceleration, speed, rotations per minute (RPM) and/or engine load, may be evaluated 311 as collected from one or more sensors, which may include any sensors as described in this disclosure. Sensors may communicate with processing unit 315 using any suitable wired and/or wireless protocol as described in this disclosure; for instance, and without limitation, one or more sensors may be embedded in processing unit 315 or in an associated phone. Sensors may include, without limitation, at least a road-facing camera with object detection and distance evaluation capabilities. Vehicular dynamics data may alternatively or additionally be received and/or collected from vehicle buses such as OBDII and/or CAN buses. Processing unit 315 and/or an AI implemented thereon may receive dynamic trip information 312 such as without limitation traffic, weather, or other information received via a network such as the Internet, for example by way of and/or from an associated mobile device.

With continued reference to FIG. 3, processing unit 315 may perform one or more AI processes to evaluate driving risk at any given time using a model driving context 313; for instance, and without limitation, an AI-powered processing unit 315 may determine, a type and/or degree of driver of inattention. Processing unit 315 may perform any determination, classification, and/or analysis steps, methods, processes, or the like as described in this disclosure using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

With continued reference to FIG. 3, training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 3, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by processing unit 315 may correlate any input data as described in this disclosure to any output data as described in this disclosure. As a non-limiting illustrative example, training data may associate driver-related data and/or vehicular dynamics data with a degree of driver inattention; such data may be received, for instance, from one or more implementations of systems and/or methods described herein, and/or using one or more entries from users and/or persons evaluating a degree of driver inattention during one or more incidents. For instance, a person may observe one or more drivers who are performing vehicular maneuvers such as driving on a training course and/or on a public street and enter data indicative of a degree of attention and/or inattention, which may be combined by a computing device such as processing unit 315 with one or more elements of driver-related and/or vehicular dynamics data to create one or more data entries of training data to be used in machine-learning processes. As a further example, training data may include sensor data recorded during, before, and/or after an accident, as described in further detail below, which may be combined with one or more elements of information concerning circumstances of the accident, such as a degree to which a driver was a fault and/or failed to identify a risk correctly and take expected evasive measures. As a further example, training data may correlate data describing conditions exterior to a vehicle, such as road conditions, behavior of other vehicles, pedestrian, bicyclist, and/or animal behavior, or the like, to risk levels and/or outcomes associated with risk levels such as accidents, collisions, or the like; such data may be collected by implementations of systems as described herein, for instance by recording data during, before, or after collisions or accidents as described in this disclosure. Various other examples of training data and/or correlations that may be contained therein are provided in this disclosure; persons skilled in the art, upon reviewing the entirety of this disclosure, will be aware of various examples of training data that may be used consistently with the instant disclosure.

Still referring to FIG. 3, processing unit 315 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 3, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include sensor data and/or data produced via analysis as described above as inputs, degrees of risk and/or degrees of driver inattentiveness as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

With continued reference to FIG. 3, system 307 and/or processing unit 315 may output signals to a driver based on risk analysis and/or attentiveness analysis as described above. For instance, and without limitation, system 307 and/or processing unit 315 may determine, as described above, that a driver has a particular level of inattentiveness based on inputs; inattentiveness may, for instance, be calculated as a numerical quantity such as a score, which may be compared to a threshold value, where inattentiveness having a score exceeding (or alternatively or additionally falling below) the threshold level may trigger generation of an alert by system 307 and/or processing unit 315. Various examples for generation of alerts and/or forms of alert output are provided in this disclosure; for instance and without limitation, system 307 and/or processing unit 315 convey an alert to an inattentive driver using sounds or voice prompts 321 selected and paced based on the level of urgency. As a further non-limiting example, where system 307 and/or processing unit 315 determines driver is drowsy, system 307 and/or processing unit 315 may warn the driver using verbal interaction 327 and/or provide attention-engaging brief dialogs stimulating mind exercises 322. Responsiveness of the user may be tracked 325 to determine length and richness of the dialog with the driver 327; such responsiveness information may be used as an additional and/or updated input to a machine-learning process and/or model, to determine a new degree of risk, attentiveness, drowsiness or other output. A microphone (optionally array of microphones) 329 and a speaker 328 (optionally a wireless speakerphone) may be used to verbally communicate with the driver. If biosensors 314 to monitors heart rate and galvanic skin response are installed in the vehicle or worn by the driver, data may be wirelessly transferred to a stress/fatigue monitoring device 316 or algorithm in the system, to provide additional physical model driver state information 317 which may be transferred to processing unit 315. In an embodiment, biosensors such as without limitation heartbeat rate, blood pressure, galvanic skin response, and/or sensors monitoring parameters associated with breathing, may be used to improve accuracy in evaluating body and mind fitness conditions such as fatigue, stress, drowsiness, and distraction, for instance as set forth in further detail in this disclosure.

Figure 4:
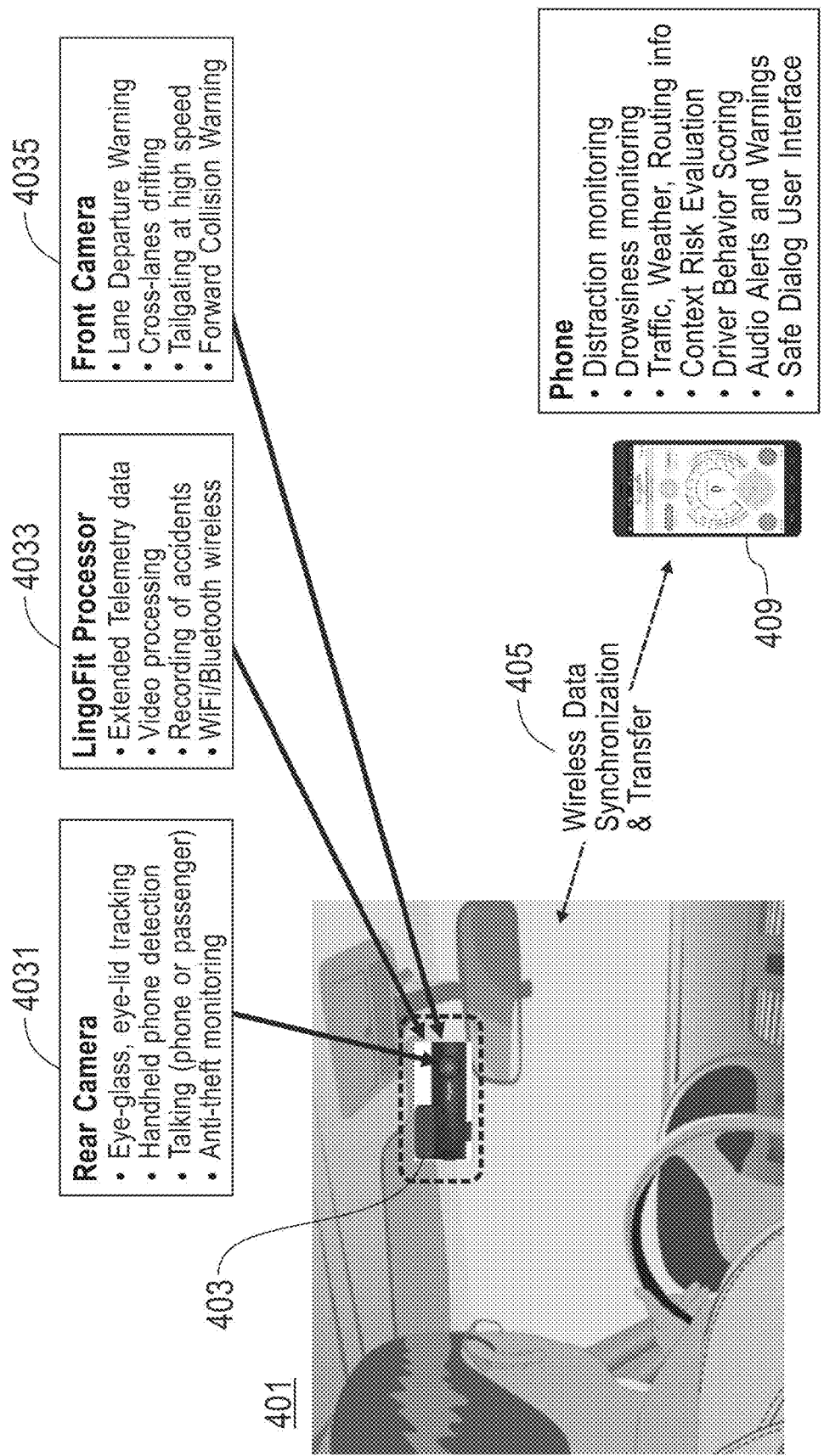
FIG. 4 shows still another exemplary implementation according to an embodiment of the present invention.

Referring now to FIG. 4, an exemplary embodiment of a portion of a vehicle 402 including a camera module unit 403 is illustrated. A unit 403 may include a driver-facing camera 4031. Driver facing camera 4031 may be mounted to or on any suitable component of vehicle and/or other structural element; for instance and without limitation, driver-facing camera 4031 may be mounted on or close to a rearview mirror. A unit 403 may include a processor 4033, which may include any device suitable for use as a processing unit 315 as described above, and/or any device that may be in communication with such a processing unit 315; processor 4033 may be configured in any way suitable for configuration of processing unit 315 as described above. Unit 403 may include a forward-facing camera 4035, which may be housed together with driver-facing camera 4031 or may be housed separately; in an embodiment, each of driver-facing camera 4031 and forward-facing camera 4035 may be connected to a dedicated processor, or both may be connected to and/or in communication with the same processor 4033. Forward-facing camera 4035 may be mounted and/or attached to any suitable structure and/or portion of a vehicle; as a non-limiting example, forward-facing camera 4035 may be attached to a windshield, next to a rearview mirror's mount. Wireless connectivity may provide data transfer between unit 403, cameras 4031, 4035, and/or processor 4033 and a processing unit 315 such as without limitation a smartphone. More specifically, unit 403 may be mounted next to the rearview mirror (attached to windshield or to body of rearview mirror) to provide best view of a driver's face while minimizing interference with road view. Unit 403 may contains a road-facing camera 4035, a driver-facing camera 4031 and a processing unit 4033 to analyze and process video streams from the two cameras, and to communicate 405 (wirelessly or via USB connection) with a mobile application on a phone 409 or other processing device as described above.

Figure 5:
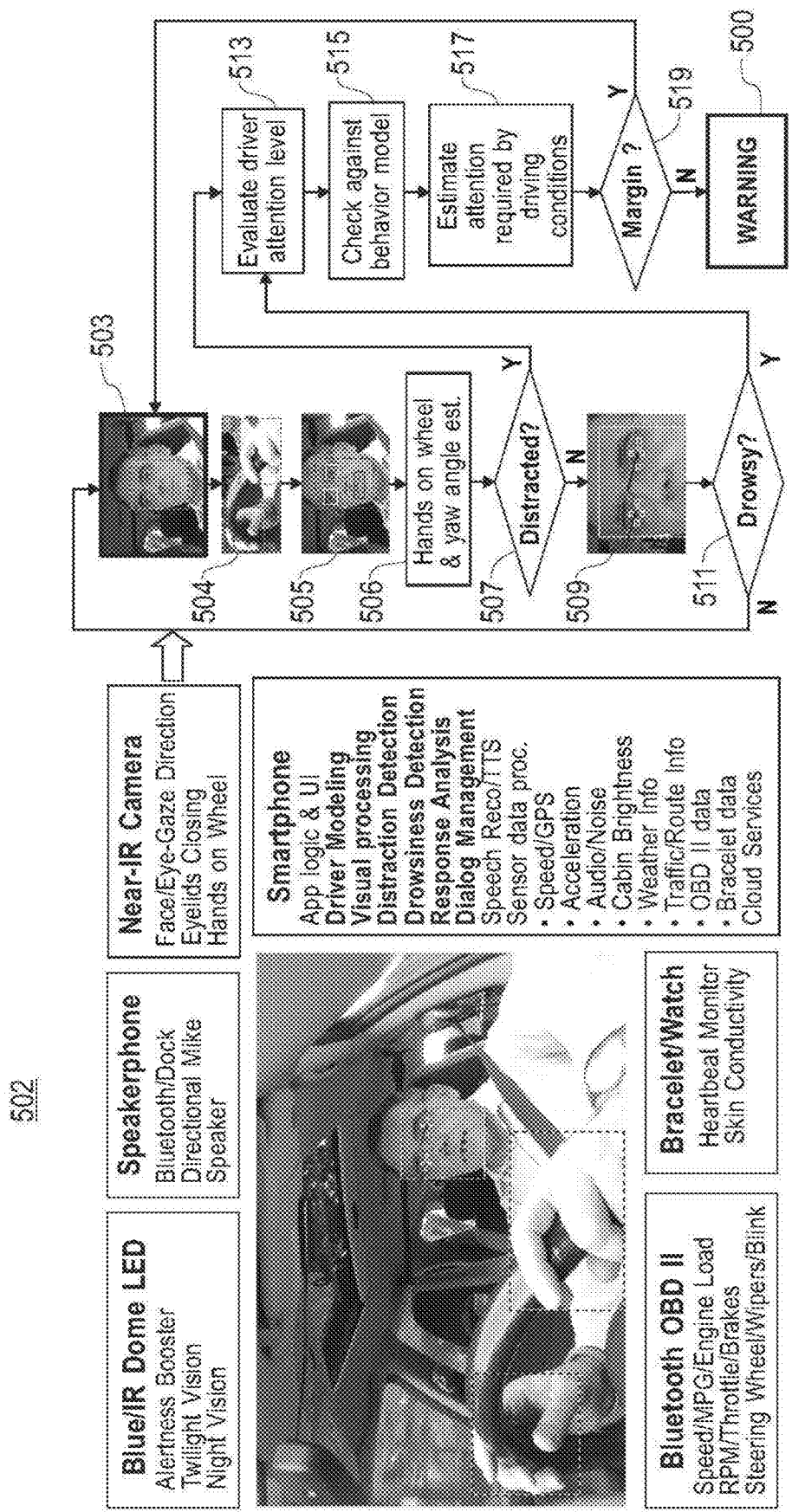
FIG. 5 shows still another exemplary implementation according to an embodiment of the present invention.

Referring now to FIG. 5, a schematic flow-process diagram illustrates how an attention monitoring system 502, which may be incorporated in and/or in communication with system 307 as described above, utilizing a driver-facing camera 307 may perform analysis using data extracted using the driver-facing camera. Such data may include, without limitation, face contours; for instance, processor 4033, system 502, and/or processing unit 315 as described above may identify eyes, nose, and/or mouth to evaluate yaw, pitch, roll of the face, eye gaze direction and eye lid closing patterns. In an embodiment, and as a non-limiting example, a neural network, for instance as described above, may be used to analyze extracted parameters and determine distraction and drowsiness conditions. As a non-limiting illustration, attention monitoring system 502 may detect a face 503 and/or hands 504 of a driver; system 502 may then identifies facial landmarks and special regions 505 such as without limitation eyes, nose, and/or mouth to estimate head pose and eye gaze direction 506, together with information about hands holding the steering wheel. For example, and without limitation, where head and/or eyes are directed away from the road, system 502 may interpret those circumstances as signaling distraction 507. System 502 may monitor an attention level of a driver 513 against a personalized behavior model 515; personalized behavior model 515 may be generated using machine-learning and/or neural net processes as described above, for instance utilizing user data collected by system 502 and/or system 307 as training data. System 502 may alternatively or additionally compare attention level to permissible thresholds, which may include thresholds corresponding to duration, frequency, and/or other patterns, compatible 517 with driving risk computed from the driving context; if a safety margin based on such models and/or threshold comparisons is inadequate 519 warning alerts 500 may be sent to driver immediately. In an embodiment, if a driver is not found to be distracted but shows signs of drowsiness 509, system may start evaluation of driver attention 513 against user behavioral models 515 and safety margins following the same flow used for distracted driving monitoring. Where driver is not found to be distracted 507 nor drowsy 511 the system may continue to observe the driver's face 503 and hands 504, and iteratively performing the above steps.

Figure 6:
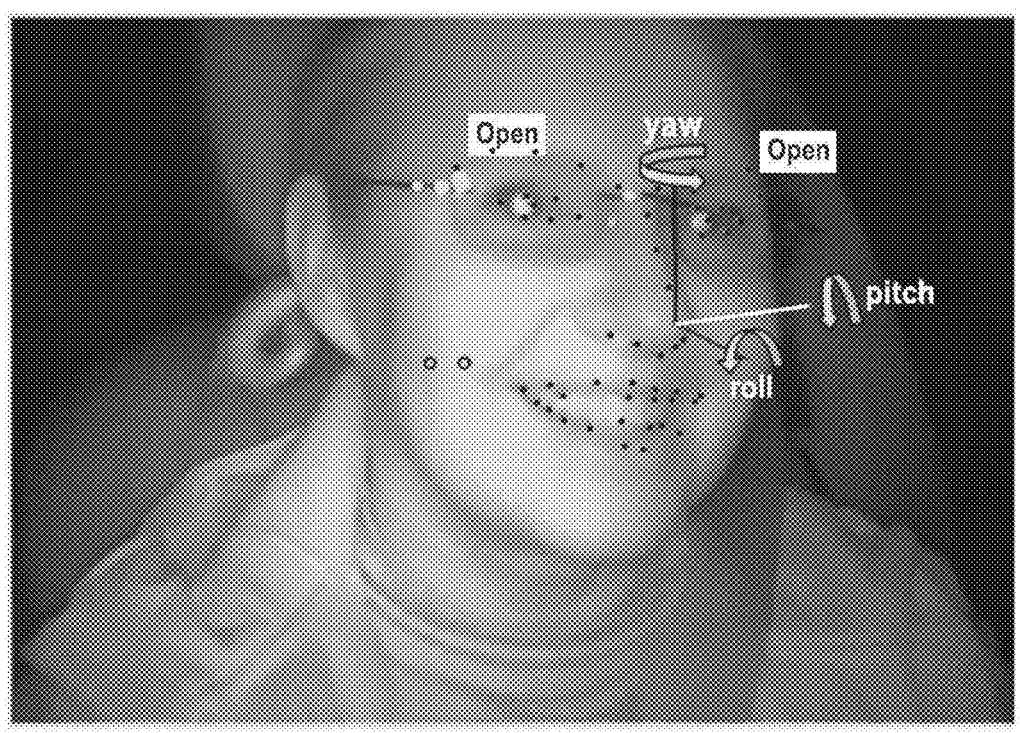
FIG. 6 shows the use of parameters as used by exemplary implementation according to an embodiment of the present invention.

Referring now to FIG. 6, an exemplary illustration is provided showing yaw, pitch and roll used to measure rotation of a driver's face in space. Image 602 shows three parameters used to classify orientation of a driver's face: yaw is defined for purposes of this disclosure as horizontal movement (left to right) of a driver's face, pitch is defined for the purposes of this disclosure as vertical movement (up to down), such as an axis about which the driver's head and/or neck might rotate to nod "yes" leaning forward and back, and roll is defined for the purposes of this disclosure as side-to-side tilting of the head, leaning left or right. In an embodiment, yaw and pitch may be parameters primarily used to identify distraction.

Figure 7:
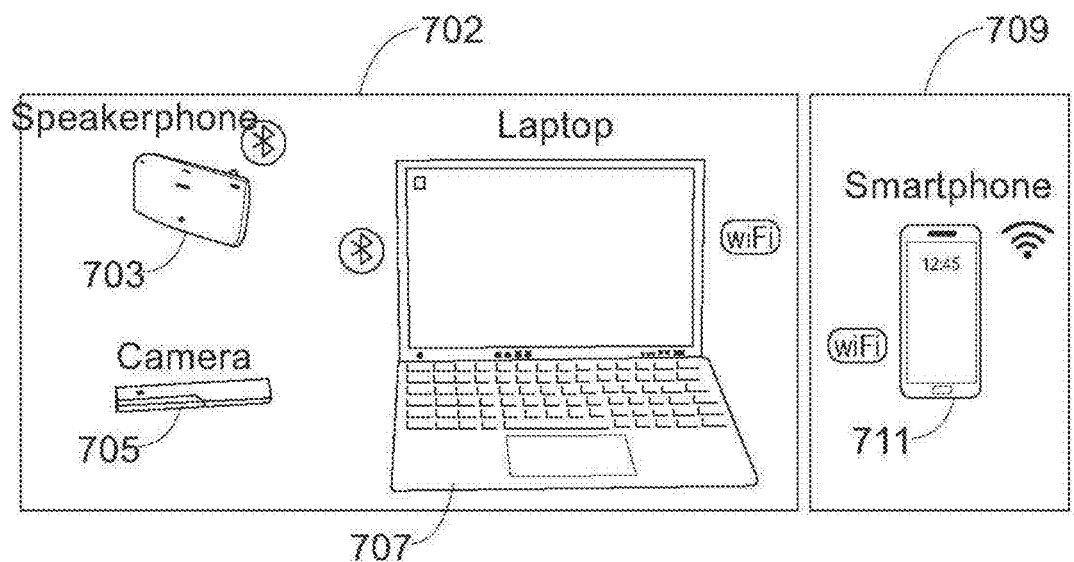
FIG. 7 shows still another exemplary implementation according to an embodiment of the present invention.

Referring now to FIG. 7, an exemplary embodiment of a system 702 for analyzing attention margin to prevent inattentive and unsafe driving is illustrated; system 702 may include and/or be included in any other system as described in this disclosure, including without limitation system 307. System 702 may include a camera, which may include any camera or set of cameras as described in this disclosure, such as a USB connected camera 705 containing visible sensors such as without limitation red, green blue (RGB) sensors, near-infra red (NIR) sensors and/or infra-red sensors, which may be used to extract facial and/or ocular features and/or orientation according to any process or processes as described in this disclosure; system 702 may alternatively or additionally include any other sensor described in this disclosure for detection of facial and/or ocular features and/or orientation. System 702 may include one or more audio input devices such as without limitation one or more microphones; one or more audio input devices may include any audio input devices as described in this disclosure. System 702 may include one or more audio output devices such as without limitation one or more speakers; one or more audio output devices may include any audio output devices as described in this disclosure. Audio input devices and audio output devices may be combined together or disposed separately; for instance, at least some audio input and output devices may be components of a single electronic device incorporated in system 702. As a non-limiting example, audio input and output devices may be contained in a speakerphone 703, which may be any mobile device or telephonic device capable of acting as a speakerphone; speakerphone 703 may be used to position a microphone and speaker in a suitable location within a vehicle for communication with a driver, such as on a visor close to the driver. A computing device 707, which may be any computing device as described herein, including without limitation a processing unit 315 as described above, may be included in system; computing device 707, which may include without limitation a laptop computer or the like, may provide computation to run analysis and/or computation, which may include any analysis and/or computation as described in this disclosure. For instance, and without limitation, computing device 707 may perform context analysis and combine results of such context analysis with features extracted by a smart camera to determine a driver's attention margin and provide feedback and/or other outputs to driver, such as without limitation audio feedback, when necessary based on the determination. One or more additional electronic devices and/or components incorporated in system 702, speakerphone 703 and/or computing device 707 may provide and/or perform one or more additional sensing and/or analysis processes and/or capabilities, including without limitation telemetry data, map/routing info, cloud services (weather, traffic), audio/video recording capabilities and/or speech recognition and synthesis for dialog interaction with the driver; for instance, and without limitation, one or more such components and/or capabilities may be incorporated in smartphone 711, which may be the same device as speakerphone 703. Persons skilled in the art, upon reviewing the entirety of this disclosure, will appreciate that any component and/or capability incorporated in smartphone 711 may be disposed in a separate or alternative device in system 702, including without limitation speakerphone 703, computing device 707, camera 705, and/or any other special-purpose and/or general purpose electronic device having such components and/or capabilities. Smartphone 711, and/or one or more additional or alternative devices including one or more capabilities and/or components described above as capable of inclusion in the smartphone 711, may further collect sensor information such as 3D accelerometer, 3D gyroscope, or other inertial measurement unit (IMU) or motion-sensing data, navigational information such as GPS location, and/or timestamps; any sensor information and/or analytical results may be used in any process and/or process step as described in this disclosure. Any sensor information and/or analytical results may be transferred in the form of received, raw, and/or processed information to a cloud 709, where a cloud 709 is defined as a remote storage and/or computational environment implemented on one or more remote computing devices, which may be implemented as appropriate for any computing device or devices disclosed herein; cloud 709 may be operated by a third party, provided as a service, or in any other suitable form or protocol, and remote devices may be geographically localized and/or dispersed. System 702 and/or any components of system 702, including without limitation any computing device 707, smartphone 709, speakerphone 703, and/or camera 705, may be designed and/or configured to perform any method, method step, or sequence of method steps in any embodiment described in this disclosure, in any order and with any degree of repetition. For instance, system 702 and/or any components of system 702, including without limitation any computing device 707, smartphone 709, speakerphone 703, and/or camera 705, may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. System 702 and/or any components of system 702, including without limitation any computing device 707, smartphone 709, speakerphone 703, and/or camera 705, may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing."

Figure 8:
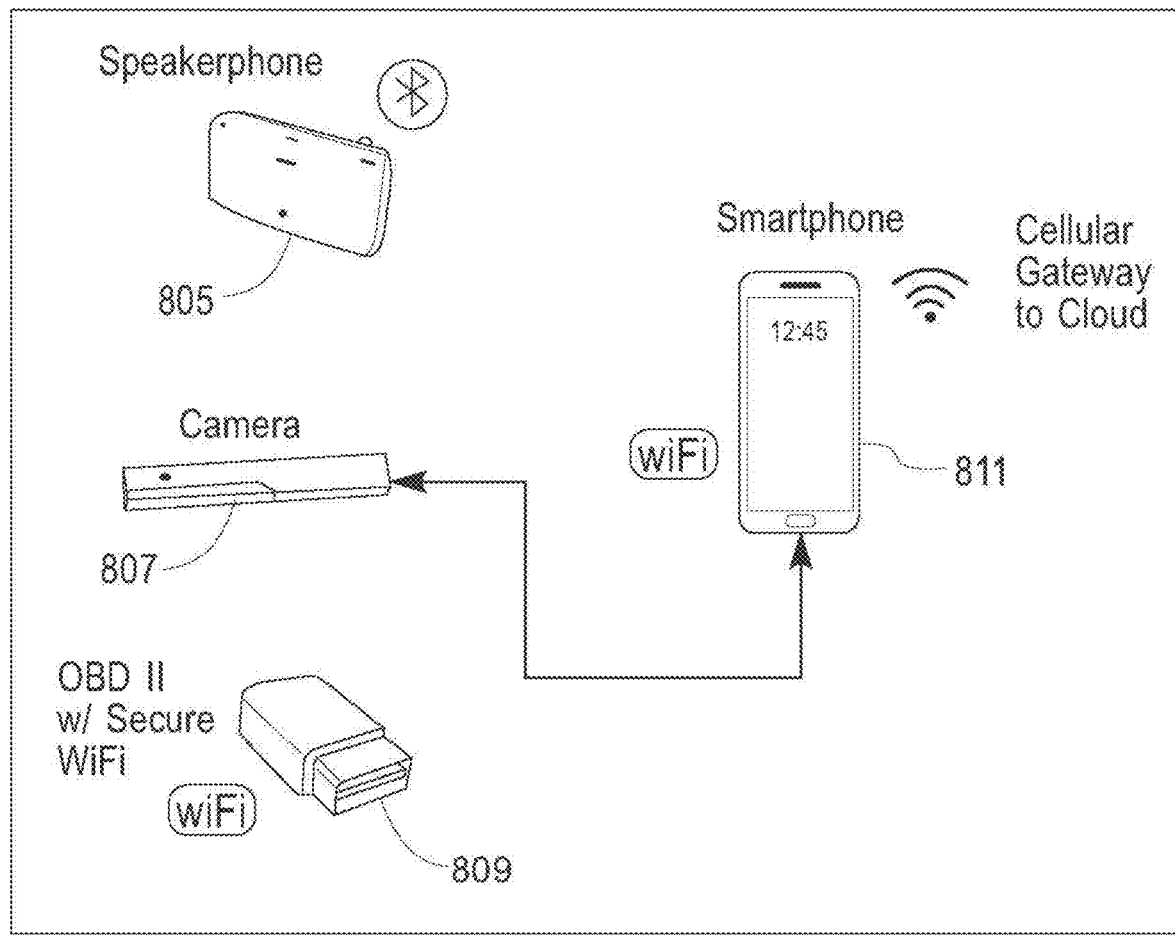
FIG. 8 shows still another exemplary implementation according to an embodiment of the present invention.

Referring now to FIG. 8, an exemplary embodiment of a system 803 for analyzing attention margin to prevent inattentive and unsafe driving is illustrated. In an embodiment, system 803 may bypass use of a laptop to run all processing on a mobile device such as a smartphone 811. Smartphone 811 may be configured in any manner suitable for configuration of processing unit 315 as described above. Smartphone 811 may be designed and/or configured to perform any method, method step, or sequence of method steps in any embodiment described in this disclosure, in any order and with any degree of repetition. For instance, smartphone 811 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Smartphone 811 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing."

Still referring to FIG. 8, smartphone 811 may be connected, for instance and without limitation via a USB OTG, to an input device; as a non-limiting example, smartphone 811 may be connected to a visible+NIR camera 807. Smartphone 811 may connect to one or more components providing vehicular analytics and/or data, which may be implemented according to any description for collection of vehicular analytics and/or data as described in this disclosure; for instance, and without limitation, smartphone 811 may connect to an optional on board diagnostics unit (OBD II) and cellular-connected WiFi hotspot 809, which may provide information about additional car data available from the vehicle bus (OBD II/CAN) and/or an alternate way to transfer processed data to the cloud, for instance as described above in reference to FIG. 7. System 803 may include audio input and/or output devices, as described above, including without limitation an optional Bluetooth speakerphone 805; audio input and/or output devices may improve quality and loudness of system-generated alerts and a better positioned microphone, to improve speech recognition accuracy.

In an embodiment, and with continued reference to FIG. 8, system 803 may use a smart camera containing RGB and NIR sensors, coupled with an infra-red LED scanner, to extract face and eyes features connected to smartphone 811. Audio input and/or output devices, such as Bluetooth connected speakerphone 805, may be used to position a microphone and/or speaker on a visor, close to the driver. Smartphone computation may perform any processes as described above; for instance smartphone 811 may run context analysis, combine results of context analysis with features extracted by smart camera 807 to determine driver's attention margin and provide audio feedback and/or other outputs based on such determination when necessary. System 803 and/or smartphone 811 may further be configured to provide and/or collect telemetry data, map/routing info, cloud services such as for weather or traffic, audio/video recording capabilities, and/or speech recognition and synthesis for dialog interaction with the driver.

Figure 9:
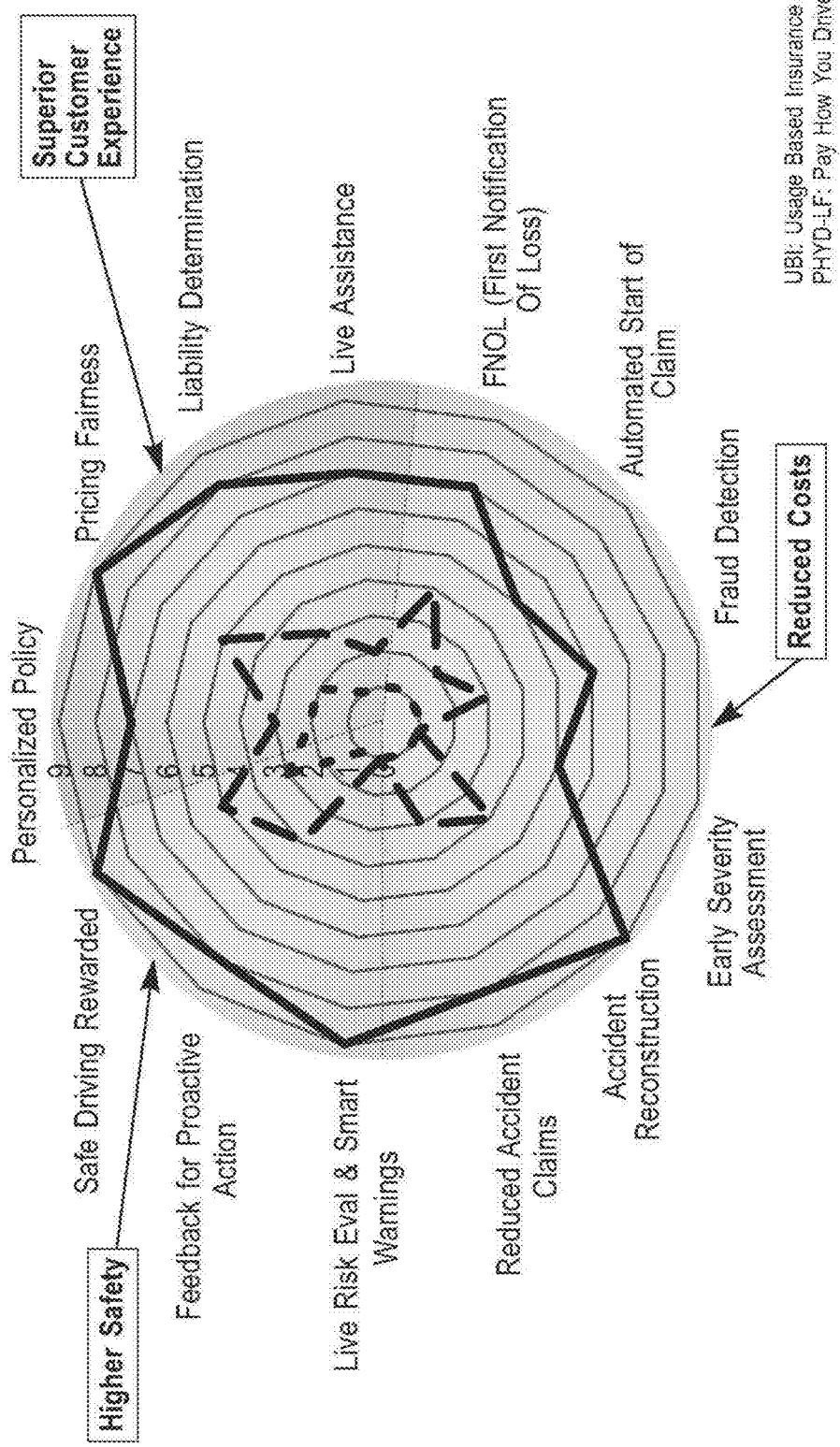
FIG. 9 shows a chart highlighting risk pricing according to an embodiment of the present invention.

FIG. 9 is a schematic illustration demonstrating how capabilities of embodiments presented herein exceed capabilities of all existing solutions for usage-based insurance, by providing richer and more accurate services.

Figure 10:
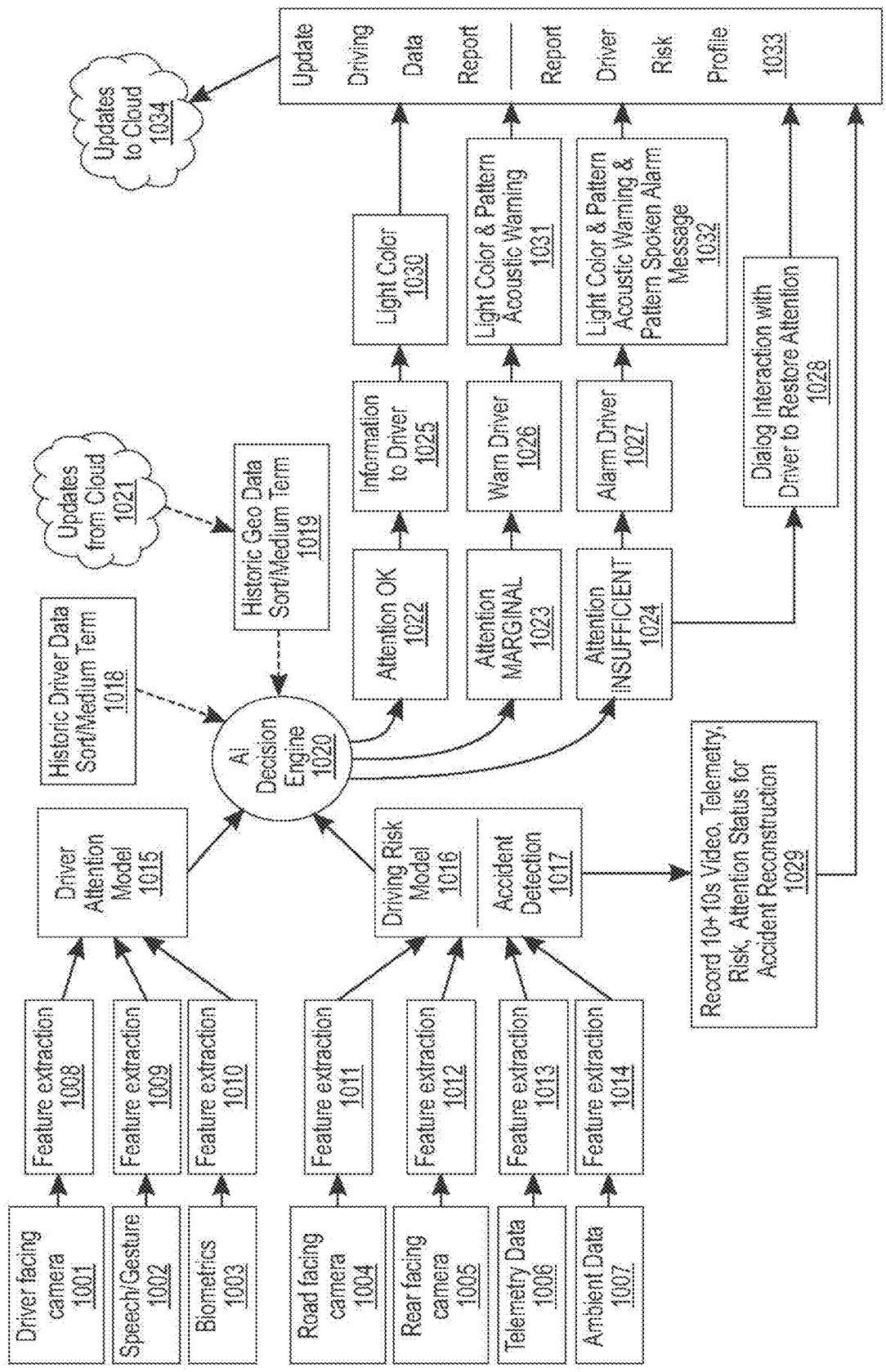
FIG. 10 shows still another exemplary implementation according to an embodiment of the present invention.

Referring now to FIG. 10, an exemplary embodiment of a possible architecture of a system, such as system 307, system 702, and/or system 803 as described above, is illustrated. System may include, without limitation, a driver attention modeling unit 1015; driver attention modeling unit 1015 may include any hardware or software module operating on, incorporated in, and/or connecting to any computing device as disclosed herein, including without limitation processing unit 315. Driver attention modeling unit 1015 may be configured, without limitation, to analyze features 1008 describing driver facial data, such us without limitation closed eyes, yawning, eyes pointed away from road, or the like, which features 1008 are extracted from visual data such as a video feed from a driver facing camera 1001; driver-facing camera may include any camera oriented to capture and/or record data about a driver as described in this disclosure. Driver attention modeling unit 1015 may be configured, without limitation, to analyze features 1009, such as verbal reactions and/or responses to system prompts, removal of hands from a steering wheel, or the like that have been extracted from speech and gestures 1002 of the driver, for instance using deriver facing camera 1001, audio input devices, or the like. Driver attention modeling unit 1015 may be configured, without limitation, to analyze features 1010 extracted from biometrics sensors 1003, including without limitation wearable biometric sensors and/or biometric sensors built into a vehicle; such features 1010 may include, without limitation features indicative of and/or measuring fatigue, stress, reaction to startling or scary events, or the like.

Still referring to FIG. 10, system may include a driving risk model 1016; driving risk model 1016 may include any hardware or software module operating on, incorporated in, and/or connecting to any computing device as disclosed herein, including without limitation processing unit 315. System may include an accident detection/prevention unit 1017; accident detection/prevention unit 1017 may include any hardware or software module operating on, incorporated in, and/or connecting to any computing device as disclosed herein, including without limitation processing unit 315. Driving risk model 1016 and/or accident detection/prevention unit 1017 may analyze features 1011 extracted from a from a road-facing camera 1004; such features may include, without limitation any features described above as representing conditions exterior to vehicle and/or driver, such as without limitation features describing and/or depicting vehicles ahead, pedestrian crossing the road, cyclists, animals, trees, road sign posts. Driving risk model 1016 may use any or all algorithms described in this disclosure to detect presence, estimated speed, direction (towards the vehicle from ahead or an adjacent lane, potentially on a collision course) to issue early warnings before full classification of the objects ahead has been completed. Embodiments disclosed herein may maximize the time available to the driver between the early warning and a potential collision, to take action (brake, swerve) and prevent a crash. Driving risk model 1016 and/or accident detection/prevention unit 1017 may analyze features 1012 from a rear-facing camera 1005; such features may include, without limitation any features described above as representing conditions exterior to vehicle and/or driver, such as without limitation tailgating vehicles coming too close. Driving risk model 1016 and/or accident detection/prevention unit 1017 may analyze features 1013 from telematics data 1006 such as speed, acceleration, braking, cornering, engine load, and/or fuel consumption. Driving risk model 1016 and/or accident detection/prevention unit 1017 may analyze features 1014 from ambient data 2007 such as weather and/or traffic information.

With continued reference to FIG. 10, system may include a decision engine 1020, which may include, be included in, communicate with, and/or operate on any computing device as described in this disclosure, including without limitation any device suitable for use as processing unit 315 as described above. Decision Engine 1020 may evaluate attention 1015 versus risk 1016 and/or historic short- and long-term data 1018 about driver's performance in past similar situations to determine a type of feedback to provide to the driver; evaluation may include any evaluation process as described above, including without limitation use of any machine learning model and/or process as described above, for instance using training data, as described above correlating attention 1015 and/or risk 1016 to alert levels. Historic geographic data 1019 may be stored locally and/or updated from a cloud 1021, which may be implemented as described above, when vehicle connectivity permits connection to the cloud 1021. If a driver's attention level is determined to be normal 1022, limited information, such as information presented using a first light color 1030 to indicate normal status, which for illustrative purposes only may be presented as a green light, is conveyed 1025 to avoid distracting the driver. If a driver's attention level is marginal 1023, a more intrusive and/or noticeable feedback signal may be output to the driver; for instance, acoustic feedback 1031 may added to the lights to call driver's attention 1026. Alternatively or additionally, a different or second light color 1030 may be employed for a driver having a marginal attention level 1023; for instance different light color may include a yellow light where a first light color as described above includes as green light. If attention is insufficient 1029 a still more intrusive and/or escalated feedback signal may be generated; for instance, and without limitation, a pattern of audible and visual alerts 1032 may be produced using an alarm driver alert 1027, escalating if the condition persists; pattern may include a third color representing a distinct color from first or second colors, such as a red color for a third color where a first and second color are green and yellow respectively. Escalation may include increases in light intensity and/or in volume of sounds produced by audio output devices. Depending on the urgency and severity a dialog interaction 1028 may be used to quickly communicate the problem detected and the identified countermeasure offered to the driver. As a non-limiting example, a pattern acoustic warning may include sequence and patterns of sounds and voices (could be audio, voice, song, chirp). As a further non-limiting example, a pattern spoken warning may include a sequence and/or patterns of voices. For instance, and without limitation, where attention is determined to be sufficient and/or normal, output may include steady green feedback light. Where attention is marginal output may include a slowly blinking yellow feedback light plus acoustic warnings, and where attention is insufficient, output may include a fast blinking red feedback light, acoustic warnings and spoken directions for correction. System may perform periodic update of driving stats in driving record, computation of driver risk profile. System may perform periodic update of all critical information to cloud, for by/trip, by/area, by/population statistical analysis. It should be noted that the use of terms "low", "marginal" or "insufficient" do not reflect a hard three scenario level of events; there may be multiple threshold tiers corresponding to multiple alert levels, a gradual continuum of escalating outputs corresponding to a continuous and/or graduated degree of risk, inattention, drowsiness, and/or combination thereof, or the like.

Still referring to FIG. 10, when a crash is detected, one or more elements of input data and/or analysis outputs may be recorded; for instance, and without limitation, an audio/video clip 1017 may be recorded and/or created from any video and/or audio inputs, any telemetry and/or ambient information, and/or any other information systems as described herein may receive as inputs and or generate using determinations and/or analysis as described herein, for some period before and/or after the crash, such as without limitation a period of up to 10 seconds before and after the crash; this may be implemented, as a non-limiting example, by maintaining audio and/or video content in memory, such as in a buffer or other temporary or long-term memory file, permitting retrieval of past-recorded audio and/or video content at least over the period before and after the crash as described above. Such video and/or audio clip may be combined with location, time, and/or sensor information to enable full reconstruction of the situation before and at the crash; all recorded data, such as without limitation video and/or audio clip, location, time, and/or sensor information, may be uploaded to cloud services and/or devices or otherwise stored in local and/or remote memory facilities. Inattention events-triggered data such as without limitation crash data, may be recorded in a driving data record, and analyzed over a time series to produce statistics in form of a driver risk profile 1033 available for use by fleet managers and/or insurance carriers. Analytics may be used to provide driving performance reports and trends to the driver, upon request by the driver or occasionally at safe times, to reinforce motivation of the driver to continue to do well. Data recorded as described above, including inattention events-triggered data, data captured before, during, and/or after crashes, or any other data usable in driving data record and/or driver risk profile 1033 may be used to create entries of training data, as described above, which may correlate any recorded information, such as without limitation sensor data, video data, audio data, analytic and/or assessment results such as risk and/or inattention levels, and/or incident data, to any other such recorded information, permitting machine learning, neural net, and/or other AI processes to create, modify, optimize, or update models and/or outputs determining any analytical and/or determined outputs and/or results as described in this disclosure; models and/or AI processes and/or outputs may be used without limitation to determine driver inattention levels based on one or more sensor inputs and/or analytic outputs, to determine risk levels based one or more sensor inputs and/or analytic outputs, to generate collision predictions based on one or more sensor inputs and/or analytic outputs, or the like. Driving data records and reports may be uploaded to the cloud 1034 for additional processing.

In operation, and still referring to FIG. 10, system may use visible and/or NIR camera pointed oriented at a driver face and/or eyes to analyze head pose, perform eye gaze tracking and/or record driver's face and back passenger seat in case of accident. Inputs such as audio input devices, cameras, and/or other sensors may be used to implement a speech and gesture interface for a driver to provide or request information via microphone, face or hand gestures. Driver state of emotional arousal, attentiveness, health, and/or mood may be detected and/or analyzed using biometric and/or vital signs data, including without limitation galvanic skin response (GSR) and/or heart rate variability (HRV) data, provided via a wearable bracelet, sensors on a steering wheel or driver seat, and/or wireless evaluation of heart beat and breathing patterns. As a further non-limiting example, system may use a forward-facing camera to detect lane lines, distance from vehicles in front, scene analysis and recording; system may use a rear camera to view, analyze, and/or record at the rear of a vehicle. System may track and/or associate together data obtained from and/or derived using accelerometers, gyroscopes, compasses, and/or GPS facilities. Further data may include vehicular data such as vehicular identification number (VIN), Odometer readings, measures of rotations per minute (RPM), and/or engine load, for instance and without limitation via an OBD II connection With continued reference to FIG. 10, system may collect and/or use in analysis data regarding traffic, weather, day/night illumination, road conditions, in-cabin noise or voices to make any determinations, training data, and/or any other processes as described herein. System may perform and/or utilize feature extraction from visual clues to determine attention, distraction, drowsiness, drunkenness, face identification, problematic interactions between driver and passenger(s), detection of hand gestures, or the like. System may perform feature extraction of spoken words via speech recognition, natural language processing (NLP), or the like;

speech-related feature extraction may be used for detection of altered voice. Biometric feature extraction may alternatively or additionally be used to detect emotional and/or physiological states such as fatigue, stress, reaction to fear/surprise, from biosensors. System may use any sensor outputs and/or analysis to perform feature extraction of objects such as vehicles, walls, poles, signs, pedestrians, or the like, as well as, without limitation, relative distance and movements, position of car with respect to lane markings, and/or detection of road signs. System may use any sensor output and/or analytical output to perform feature extraction describing a vehicle position and/or speed behind car. Feature extraction may be used to determine driving smoothness and/or aggressiveness of a vehicle containing system and/or another vehicle. System may use sensor and/or analytical process outputs to perform feature extraction to determine ambient "harshness" and impact on driving stress Still referring to FIG. 10, system may use machine-learning processes to generate and/or utilize models and/or training data to generate outputs; machine learning may, as a non-limiting example, be used to continuously evaluate driver attention level, to continuously evaluate driving risk, to detect and/or predict vehicular collision or crash conditions, or the like. Features may be extracted by system from past behaviors and/or driving skills of a driver. Features may be extracted from past and/or dynamically reported critical information about traffic jams, dangerous intersections, ice patches, car accidents, or the like, for instance as received via data connections to cloud servers or the like. System may instantiate an intelligent decision engine to compare estimated attention level exhibited by the driver to an attention level required to handle the estimated risk condition, using without limitation machine learning, deep learning, and/or neural net processes and/or models as described above. Decisions and/or determinations may alternatively or additionally be based on past performance of the driver, and adjusted for perceived changes of the day, including measures of nervousness, anger, and/or fatigue. Decision and/or determinations may be performed using real time ambient data updates from Cloud Services, for instance via a phone connection, obtained by system. As a non-limiting illustration, system may perform a determination that driver attention level is adequate or better, for the driving task; system may provide a minimal status update to a driver as a result, as described above. System may perform a determination that a driver attention level is marginal and provide proactive information to driver that attention is borderline as a result. System may perform a determination that driver attention level is insufficient to handle the driving task and generate proactive information to driver that attention is insufficient, and action has to be taken; system may provide information to driver about reasons for the insufficient attention and requests to correct behavior. Each of these steps may be performed using any suitable component and/or process as described in this disclosure.

Figure 11:
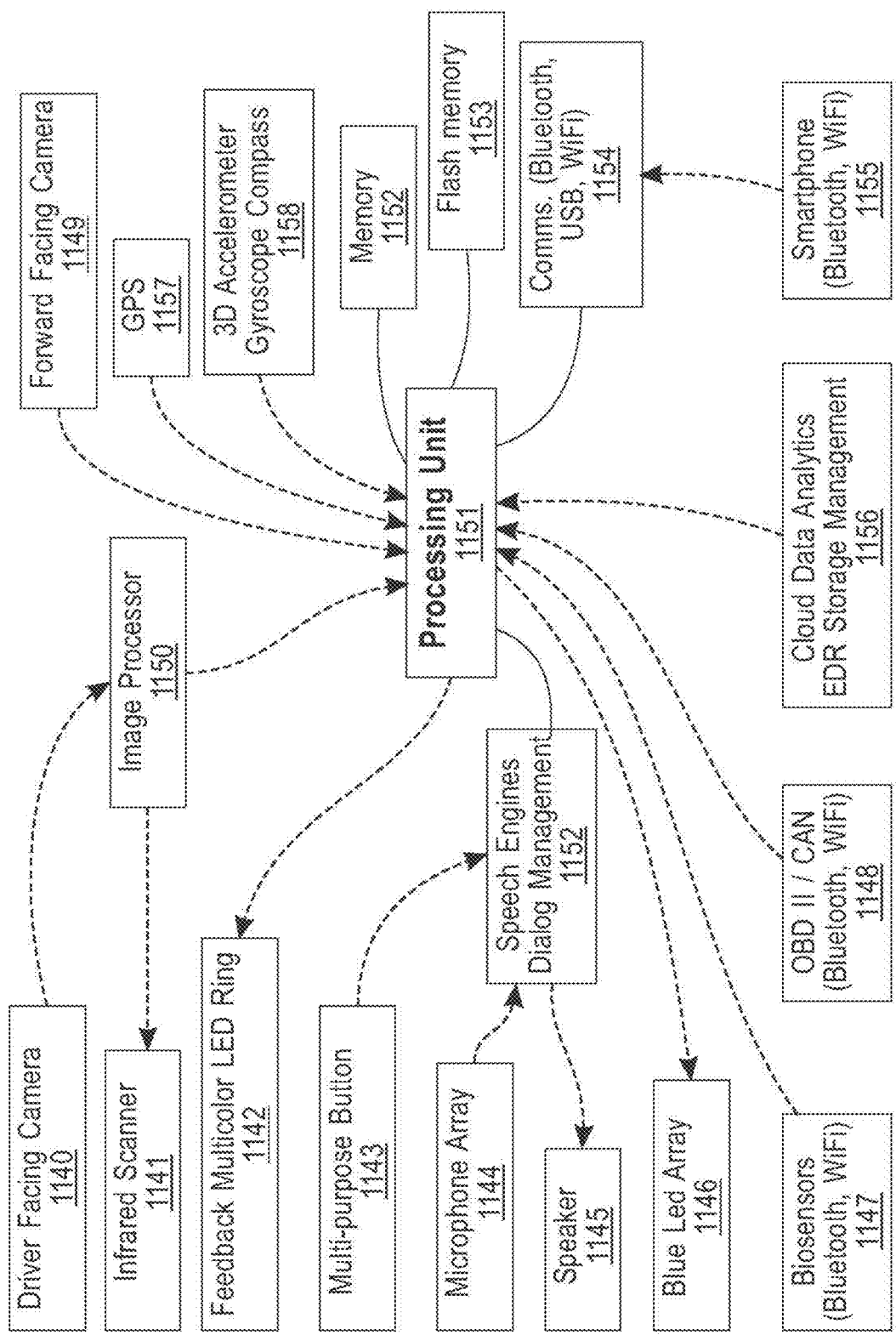
FIG. 11 shows still another exemplary implementation according to an embodiment of the present invention.

Referring now to FIG. 11, a further illustration of an exemplary embodiment of a system as described herein is illustrated, which may include and/or be incorporated in any system as described in this disclosure. System may include an image processor 1150; image processor may include any computing device, including without limitation any device suitable for use as processing unit 315 as described above, and/or any software and/or hardware module operating on or connected to such a computing device. Image processor may analyze video content coming from a driver-facing camera 1140, which may include any device suitable for use as a camera as described in this disclosure, including without limitation any driver-facing camera as described above. Video content may alternatively or additionally include data from an infrared LED scanner 1141 or the like; for instance, image processor 1150 may use optional aid of an infrared LED scanner 1141 to get depth information for more accurate face rotation detection and in dim or no light conditions. Near IR and RGB cameras may be deployed facing driver and/or back passenger seat. A Solid-State infrared LED scanner (for depth sensing and eye gaze tracking) may also be used to scan and/or capture visual information of a driver, passenger, or other person. System may include speech engines, such as without limitation systems useable for speech recognition and/or synthesis; system may include a module for dialog management 1152 to analyze voice and sound picked up by microphones 1144 and generate audio and verbal prompts via speakers 1145. Microphones 1144 and/or speakers 1145 may include any devices suitable for use as audio input and/or output devices as described above; audio input devices may, as a non-limiting example, include a beamforming microphone array for driver vocal input, speech ID verification, ambient sound analysis, or the like. Audio output devices may include, as a further non-limiting example, one or more speakers for acoustic/voice feedback to driver. Light may be generated using any light output device described in this disclosure, including without limitation a 470 nm Blue LED array for retina stimulation and/or alertness restoration. In an exemplary embodiment, system may include a multipurpose button connected to speech engines and/or dialog management components and/or modules 1152 multi-purpose button may be a button that causes system to change interaction mode, request help, or enter emergency protocols such as initiation of emergency telephone calls, depending for instance on context and/or how many times button has been pressed.

Still referring to FIG. 11, system may include a main processing unit 1151, which may include any computing device as described in this disclosure, including without limitation any device suitable for use as processing unit 315 as described above. Main processing unit 1151 may be perform actions such as processing features created by image processor 1150, including without limitation detection and/or description of head rotation, eyelid closing, mouth opening, or the like. Main processing unit 1151 may process video from a road facing camera 1149, which may include any device usable as a camera as described in this disclosure, including without limitation any road-facing camera as described in this disclosure, to identify and classify objects ahead of the vehicle. Main processing unit 1151 may collect GPS 1157 information to time- and geo-stamp all events, and/or to calculate speed. Main processing unit 1151 may collect and/or process 3D accelerometer, 3D gyroscope and/or compass information 1158 to determine vehicle motion and forces involved in motion, collisions, or the like. Main processing unit 1151 may interact with speech engines 1152 to control communication with the driver. Main processing unit 1151 may control activation of a stimulating light, such as without limitation a 470 nm Blue LED 1146 to assist attention stimulation of a drowsy driver. As a further example, a multicolor LED ring light may be used for visual feedback to driver. Main processing unit 1151 may collect information from biosensors 1147 to estimate fatigue and stress of the driver. Main processing unit 1151 may communicate with an OBD II connected device 1148 to collect additional vehicle information. Main processing unit 1151 may process electronic data record information and synchronize with a cloud 1156 when connectivity permits. Main processing unit 1151 may connect with available smartphone and wireless speakerphones to collect route, traffic, weather info and to interact with driver.

With continued reference to FIG. 11, system may include a system memory 1152, which may include any memory storage device and/or component as described in this disclosure. System memory 1152 may be used by main processing unit 1151 to hold processing information. System memory 1152 and/or system may include one or more memory storage components and/or elements, such as without limitation solid state storage 1153, to hold processed information. In addition to accelerometer/gyroscope/compass information 1158 being available in the main unit as described above, system may process similar information using a mobile app installed on a phone 1155 or other mobile device. Phone 1155 or other mobile device may, as a non-limiting example, return information about relative motion of the phone 1155 in the vehicle, for instance to determine potential distraction conditions if the phone is held by the driver. Each component in system may communicate with each other component using any wired or wireless communication protocol, including USB 3.1, Bluetooth, Bluetooth LE, WiFi, or the like.

Figure 12:
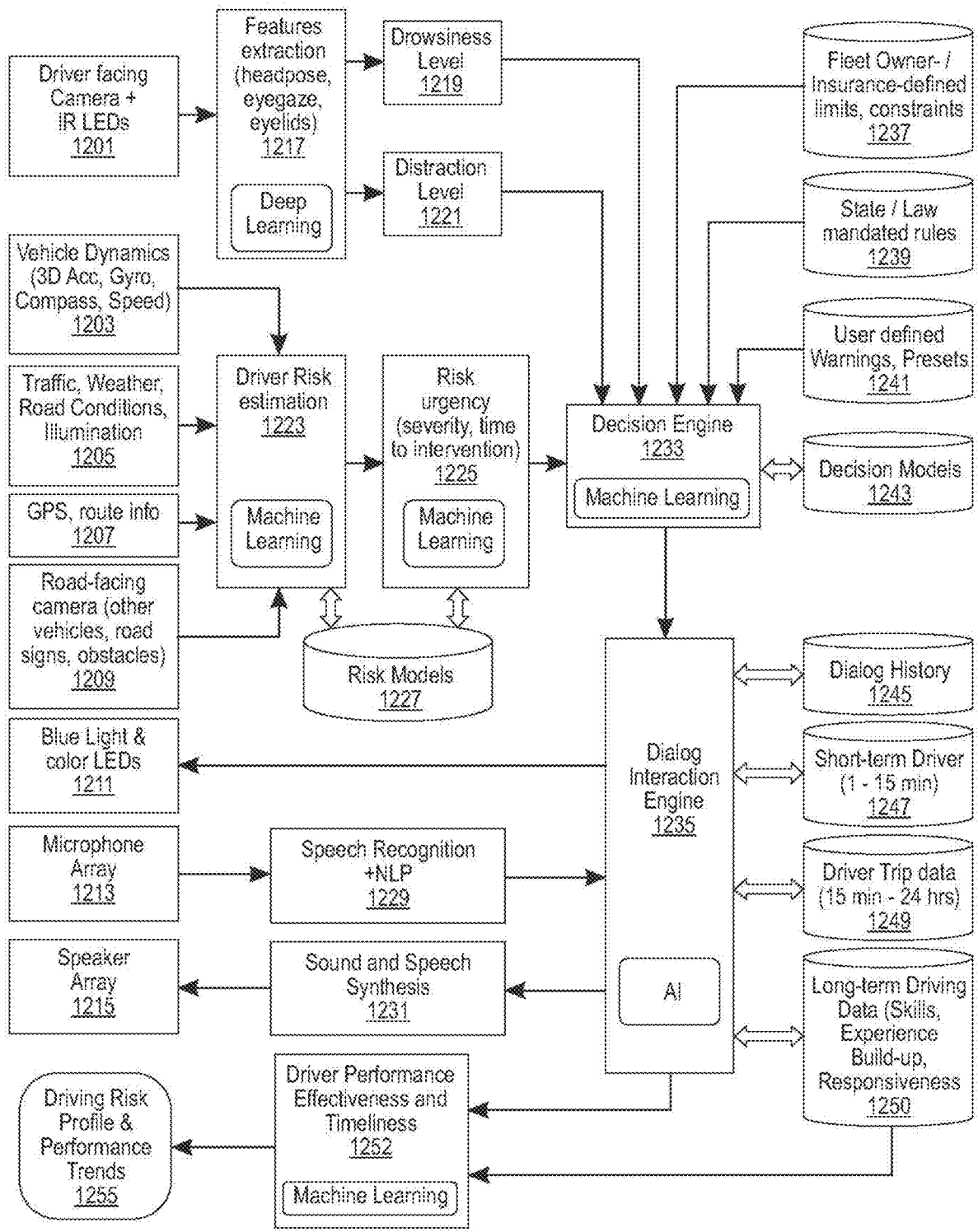
FIG. 12 shows still another exemplary implementation according to an embodiment of the present invention.

Referring now to FIG. 12, an exemplary embodiment a system which may include and/or be included in any system as described above is illustrated. System may include a driver facing camera 1201 configured to generate a video stream for a feature-analysis unit 1217; feature analysis unit may include any computing device as described above, including without limitation any device suitable for use as processing unit 315, and/or any hardware and/or software module included in, operating on, and/or in communication with such a computing device. Feature analysis unit 1217 may use deep learning, neural net learning, and/or machine learning, as described above to extract head pose, eye gaze, and/or eyelid closing information; the features may be analyzed by a drowsiness analysis unit 1219 and/or a distraction analysis unit 1221 that may determine the respective severity levels, for instance as described above. Each of drowsiness analysis unit 1219 and distraction analysis unit 1221 may be implemented as any computing device as described herein, including without limitation any device suitable for use as processing unit 315, and/or as any hardware and/or software module incorporated in, operating on, or in communication with such a computing device. System may include a driving risk estimation engine 1223, which may be implemented as any computing device as described herein, including without limitation any device suitable for use as processing unit 315, and/or as any hardware and/or software module incorporated in, operating on, or in communication with such a computing device. Driving risk estimation engine 1223 may elaborate information from vehicle dynamics 1203, traffic/weather/road conditions 1205, GPS/route info 1207, and/or road facing camera 1209 to characterize risk and to escalate urgency 1225 if driver fails to take action. Machine learning and precomputed risk models 1227 as described above may be used to calibrate the risk estimation process to the skills and experience of the driver.

With continued reference to FIG. 12, system may include a main decision engine 1233, which may be implemented as any computing device as described herein, including without limitation any device suitable for use as processing unit 315, and/or as any hardware and/or software module incorporated in, operating on, or in communication with such a computing device. Main decision engine 1233 may be configured to collect information about distraction levels 1221, drowsiness 1219 levels, and/or risk levels 1225 as described above, leveraging mandated behavior guidelines 1237, 1239, taking into account user preferences 1241 and relying on decision models 1243 and Machine Learning, which may be implemented according to any procedure described in this disclosure, to determine what messages to convey to the user. System may include a dialog interaction engine 1235, which may be implemented as any computing device as described herein, including without limitation any device suitable for use as processing unit 315, and/or as any hardware and/or software module incorporated in, operating on, or in communication with such a computing device. Dialog interaction engine 1235 may be triggered by the decision engine 1233 to generate prompts to a driver using sound and speech synthesis 1231 to drive a speaker array 1215, which may be implemented as any audio output device described herein; microphones 1213, which may include without limitation any audio input devices as described herein, may capture driver's reaction, comments, requests to create actionable text via speech recognition and NLP 1229 used by the dialog interaction engine 1235 evaluate responsiveness of the driver. When dialog is used to assess or restore attention of a drowsy driver, dialog interaction engine 1235 may rely on dialog history 1245, short-term driver information 1247, trip data 1249 and/or information about driver's skills 1250 to determine type of content, pace, and/or length of the interaction to drive the dialog with the driver. Long-term driving data 1250 and statistics about dialog interactions 1235 may be used to evaluate driver performance effectiveness, such as without limitation an ability to take appropriate corrective actions in a timely manner, responsiveness of the driver to system generated guidance 1252, and to compile driving risk profiles and driver performance trends 1255. Dialog interaction engine may use the blue LED light 1211 to generate brief timed blinking patterns as part of a mechanism to evaluate driver's alertness (e.g. mimicking light patterns with corresponding blinking of eyelids).

Embodiments of systems as described above may be configured to perform distraction detection. Conditions analyzed to perform distraction detection may include, without limitation, glancing at a center-stack display, touching center-stack display, glancing at mobile phone on cradle, touching mobile phone screen on cradle, reading text on mobile phone (hand-held), touching screen on mobile phone (hand-held), text-typing on mobile phone (hand-held), eating or drinking, smoking, talking over mobile phone (speakerphone/ear set), interactions with other passengers, singing, combing hair/shaving, and/or putting on make-up.

Embodiments of systems as described herein may be used to perform drowsiness detection, including without limitation detection of Stage 1-2-3 of drowsiness using PERCLOSE, HRV, Blood Pressure, Breathing Pattern and/or GSR. Embodiments of system as described herein may perform driver identification, including without limitation using visual face analysis, face ID verification, voice ID verification, and/or driving style behavior as a behavioral "fingerprint." Embodiments of systems as described herein may perform passenger presence and behavior detection visual count of passengers by means including without limitation analysis of passengers' interactions with driver. Embodiments of systems as described herein may perform theft detection and recording, engine-off vibration analysis, low-frequency video sampling, driver detection forward scene analysis, forward distance/collision detection lane departure detection, vehicles recognition and distance/delta speed measurement driver risk profiling, tailgating, late braking, hard braking, hard acceleration smooth cornering, smooth acceleration, gradual braking lane-keeping accuracy, swerving, eyes-on-road vs. mirrors vs. elsewhere ratio context risk evaluation, acceleration/deceleration/cornering speed (relative to posted limit), travel-time distance from vehicle(s) in front traffic and accidents ahead, time/distance to exit ramp, and/or weather and temperature conditions road pavement conditions Embodiments disclosed herein may use machine learning to create models used to interpret a multiplicity of data collected in a vehicle and for making real time decisions. Initially thresholds for acceleration (longitudinal, lateral-→acceleration/braking, cornering), speed, distance (in sec) from vehicles ahead, distance from lane markings, times for eyes taking away from watching the road to check rearview mirror, instrument cluster, center dashboard, . . . based on speed, skill level, or the like may be set using simple rules and common-sense values and/or values derived in earlier iterations using, for instance, other vehicles and/or drivers. Data recording in driving simulators may be used to fine tune the initial models and convolutional neural networks will be used to extract visual features of drivers' behaviors.

As testing of the system and data collection may be performed on the road, statistical models describing driver behavior correlated with multiple sensors (motion, visual, audio, biosensors) may be improved via a machine learning process. Data may be initially annotated by experts, including information gathered from the drivers that were monitored. Over time processes may become progressively less supervised. Eventually a subset of key features extracted from driving data may feed self-learning algorithms to guarantee continuous improvements of the system over time.

Description of EDR

A driver of a vehicle may own data accumulated in the process of driving the car, including their electronic driving record (EDR). Driver has the ability to suspend/revoke select access rights at any time, including while driving. Driver can reinstate access rights dynamically while driving or at the end of a trip, before information is synchronized with the network (if not connected live). A core idea relating to driver data management is generation, maintenance and distribution of EDR per data owner's preferences and insurer's incentives. Driving data from EDR Bank may be distributed to parties who own the data and can benefit from granting access rights to car insurance companies; EDR access conditions, including what type of data is provided, when the data is provide, to whom the data is provided and under what conditions the data is provided, may be controlled and/or specified in embodiments described herein. While driving, two categories of data may be collected 1) data external to the car, 2) data collected from the car, including driver's behavior. Driving data may include a multitude of parameters such as driver id, location, speed, acceleration, braking, cornering, throttle aperture, steering wheel motion, time of day, weather conditions, traffic information, proximity to surrounding cars (ahead, behind, on the side), positioning in lane, driver face/eye gaze direction, eyelids closing patterns, hands position and gestures, spoken utterances and their transcription, acoustic noises in the cabin, video recording of key events (e.g. crashes). Any or all driving data may be stored in an EDR, for instance and without limitation in the form of live and/or historic data, later to be processed, analyzed and distributed accordingly. Embodiments described herein may control access to EDR information, when, at what time and under what conditions, as defined and legally released by the driver. EDR data may be stored on secure cloud storage, for instance by aggregating data uploaded to cloud services as described above, and data access may be managed as part of provision of cloud service, to drivers and other users authorized by the driver, such as without limitation insurance carriers, healthcare providers, car manufacturers, or the like. EDR data generated by the invention may be owned by a user such as a driver or owners of a fleet, who may have overriding authority to decide who else gets access to it. Changes in access rights may trigger respective alterations in insurance benefits. Data access authorization may take place once for a single access, or a driver may authorize on continuous basis until authorization is revoked. Sharing of individual parameters may be used to negotiate service terms (e.g. discounts on car insurance premiums), which may result in possible individual financial discounts or penalties. Shared parameters may be clustered to match requirements by individual car insurance companies. Car insurers may be offered to bid among themselves to provide competitive insurance services based on the parameters in the EDR, which may be limited to those that a driver is willing to share.

EDR may be implemented in exemplary embodiments as follows: EDR may be managed on a mobile application on a smartphone owned by a driver and stored, in a non-limiting example, on 1) the smartphone itself, 2) on a dedicated device, mounted on the dashboard or windshield or 3) in a dashboard-mounted unit (e.g. infotainment system, CarPlay or Android Auto). A driver may be alerted in real time when preset thresholds are passed during driving, in order to be able to correct driving style and behavior when needed. A driver has the ability to determine EDR read access rights by other mobile apps, by other parties like the manufacturer of the car or involved Tier-1 suppliers, by service providers (e.g. UBI car insurers). Selection of the access rights by individual parties for specific sets of parameters may be performed via a configuration process on a PC/Laptop, via Web or on the mobile device containing the EDR database. Secure and/or encrypted synchronization may allow a smartphone or other computing device to transfer EDR content (live or historic) to a cloud service as described above for further processing and storage backup; some information may be decoupled, such as without limitation time and GPS location, and only associate it to significant events like exceeded speed, hard braking or the like; this may have the result that instead of distributing time and place location all the time, which gives the insurance no necessary information from a risk evaluation point of view, but exposes the driver to the risk of being monitored for unapproved reasons, the driver only exposes those pieces of information which are relevant, such as where/when the driver speeded, hard braked, or the like. Relative infrequency of speeding and hard braking may result in collected information being very limited, potentially zero if there are no driving offenses; the more the driver complies with the rules, the less private information may be exposed to the car insurance, which provides a real incentive for good driving behavior.

As an overview and summary, embodiments disclosed herein may include methods to automatically monitor and analyze driver distraction to generate context-aware safety reminders. Embodiments disclosed herein may include means of visual stimulation (via HUD) to evaluate driver's attention and responsiveness. Embodiments disclosed herein may include means to make decisions from a plurality of inputs including user connection state, user location, user locale, associations learned through prior observation, wherein not directly specified by the user, external factors as included in transportation factors, weather, destination status. Embodiments disclosed herein may include means of visual analysis of scene ahead used to verify driver's attention (Exit sign question). Embodiments disclosed herein may include means to learn user's behavior automatically. Embodiments disclosed herein may include means to automatically poll user for feedback.

Embodiments disclosed herein may include a program that user may elect to add to their app portfolio. Embodiments disclosed herein may include means to configure the device via response to the setup dialog. Embodiments disclosed herein may include means to perform modifications, including adding, removing, changing. Embodiments disclosed herein may include methods of analyzing said patterns for user's review and modification. Embodiments disclosed herein may include means to invoke analysis of reminders. Embodiments disclosed herein may include means to discover redundant reminders which can be discarded.

Embodiments disclosed herein may include means to identify reminders which conflict with situational context. Embodiments disclosed herein may include means to identify reminder gaps. Embodiments disclosed herein may include methods of analyzing inside video for accident reconstruction and outside video live feed/context for damage assessment.

Embodiments disclosed herein may include means of using a clamp on box containing camera/lights/LEDs/mike plus detached camera facing forward. Embodiments disclosed herein may include means of using modified rearview mirror with translucent glass. Embodiments disclosed herein may include means of using correlation among multiple cameras.

Embodiments disclosed herein may include methods to monitor and analyze the level of driver drowsiness. Embodiments disclosed herein may include means of using blue light to slow down melatonin production to counteract drowsiness while driving. Embodiments disclosed herein may include means of using colored lights and acoustic feedback on attention level and attention triggering events (red-yellow-green), using constant/intermittent pattern, and/or using intensity adjusted to internal illumination level.

Embodiments disclosed herein may include methods to monitor in cabin behavior of driver and passenger in order to flag dangerous behaviors. Embodiments disclosed herein may include means to recognize dangerous actions and take action for instance and without limitation by sending alerts. Embodiments disclosed herein may include means to identify dangerous objects such as weapons and take action such as without limitation sending alerts.

Embodiments disclosed herein may include methods of detecting potentially dangerous health conditions. Embodiments disclosed herein may include means to apply bracelet wireless recording of HRV and GSR. Embodiments disclosed herein may include means of wireless (non-touch) measurement of HRV and breathing. Embodiments disclosed herein may include means of collecting bio/vital signs to work with onboard personal diagnostics to detect situations that require attention by their physician or specialist. Embodiments disclosed herein may include means to provide automated "virtual personal nurse" assistance to driver with chronic condition (recommended actions and monitoring against known risk conditions. Embodiments disclosed herein may include methods of audio-visual speech recognition to enhance robustness in noisy conditions.

Embodiments disclosed herein may include methods of improving driver risk evaluation based on changes in motion energy while braking, rather than simply decelerating (same deceleration at high speed much riskier than at low speed). Embodiments disclosed herein may include methods of virtual coaching (e.g. keep proper distance, avoid late slow down, stay in right lane, stay center in lane, optimize turn trajectories) based on models trained by professional drivers, large number of other drivers in the same area. Embodiments disclosed herein may include methods of analysis of cloud of eye gaze tracking points to predict level of driver alertness (distinguish between fixations caused by high interest vs. caused by drowsiness/lack of attention). Embodiments disclosed herein may include methods of using Vehicle-to-Vehicle (V2V)-like information exchange social networks such as Waze, to inform nearby drivers about fitness/distraction/drowsiness/ . . . of a particular driver, to increase safety margins (distance between vehicles, higher attention to unexpected maneuvers, . . . ). Embodiments disclosed herein may include methods for extending driver attention monitoring to use in trucks, motorcycle helmets, trains (for conductors), planes (pilots). Embodiments disclosed herein may include methods for extending driver attention evaluation for use at home, at the office, at schools (education). Embodiments disclosed herein may include methods of using audio-visual recognition to automatically spot questionable activities inside cabin (e.g. screaming voice associated to body movements across seats)

Embodiments disclosed herein may include methods for usage-based insurance security and privacy, including without limitation methods of collecting and storing driver data to automatically monitor driving context where monitoring of context includes detection of driver's behavior and attention as well as car parameters, internal and external. Embodiments disclosed herein may include a program that monitors driver behavior. Embodiments disclosed herein may include an apparatus (hardware and software) to measure driver attention. Embodiments disclosed herein may include means to provide real time feedback to the driver. means to learn user's behavior automatically. Embodiments disclosed herein may include means to automatically poll user to evaluate responsiveness/alertness in presence of symptoms of drowsiness. Embodiments disclosed herein may include methods of data access policy management to automatically set driver's preferences and deliver feedback. Embodiments disclosed herein may provide a mechanism for definition of data access rights with degrees of flexibility. Embodiments disclosed herein may have dynamic character of data access rights. Embodiments disclosed herein may include an ability to suspend/revoke select access rights at any time, including while driving. driver can reinstate access rights dynamically while driving or at the end of a trip. Embodiments disclosed herein may address various aspects of EDR data, its varied nature (data inside and outside of the car, driver's behavior). Embodiments disclosed herein may let the driver identify who gets to see what EDR data, when and how. Embodiments disclosed herein may include use sensors to collect and process most valuable driver behavior data. Embodiments disclosed herein may include create driver behavior and attention models. Embodiments disclosed herein may include process EDRs dynamically and grant access rights to EDR data on the fly Embodiments disclosed herein may include methods to deliver the product of the above embodiments. Embodiments disclosed herein may include means to invoke collection and storage of driver data. Embodiments disclosed herein may include means to analyze driver data on the fly. Embodiments disclosed herein may include a mechanism to enable bids by insurance companies for the driver's business, based on privacy settings defined by the driver.

Embodiments disclosed herein may involve insurers competing for the driver's business; drivers may be able to select best fitting insurer or combine insurers on the fly given a specified set of private data that the driver is willing to make available. Embodiments disclosed herein may enable policy premium pricing by the hour of coverage and based on driving behavior (e.g. for car rentals). Embodiments disclosed herein may perform dynamic control logic that determines multiple data access patterns for the same users depending on the context. Embodiments disclosed herein may include means for an insurer to override information protection locks set by the driver when the situation requires it (e.g. system detects a serious accident; it verifies whether the driver is conscious and able to authorize disclosure of location etc. for use by ambulance, police to come to rescue). If driver is unconscious (no dialog, video analysis of the cabin), for instance, insurance may override lock mechanism for the benefit of saving driver's life. Embodiments disclosed herein may include means for the driver to quickly/temporarily change privacy settings in urgent situations.

Embodiments disclosed herein may include methods to provide Qi wireless charging to devices attached to car windshield: transmitter coil embedded in windshield at array of location at the top or bottom of the windshield, to enable multiple devices or multiple positions to be used. A receiver coil may be installed in docking support with sucking cup, and connected to the device (e.g. smartphone).

Embodiments disclosed herein may include methods to anonymize video recordings in car while preserving attention/distraction/drowsiness extracted features. Face of driver may be analyzed for head pose pitch/yaw/roll, eye gaze tracking left/right/up/down, independent eyelids closing frequency/duration/pattern, mouth shape/opening/closing, lips shape/opening/closing. Then all the collected features may be used to control rendering of a synthesized face, in sync (or short delay) with the original face expressions and movements of the driver; the synthesized face may be put in place of the driver's face in the video recording, resulting in a hybrid video containing real visual context and synthesized face, to enable examining of driver behavior in dynamic context, without revealing identity of the driver.

Embodiments disclosed herein may include methods for evaluation of user attentiveness when listening to or watching an advertisement message. Visual and audio analysis of a user's reaction to a message may be used to rate pleasure/satisfaction/interest or lack thereof and confirm that the message has been received and understood, or not; this may be particularly useful in a contained environment like a car cabin (especially in a self-driving or autonomous vehicle) but may be extended for use at home or work, where one or more digital assistants have the ability to observe a user's response to ad messages. With some constraints, it can be used also on mobile phones, using the front-facing camera after verifying that the user looking at the screen/camera is the target of the evaluation.

Embodiments disclosed herein may include methods for evaluation of user responsiveness to guidance/coaching, to determine if communication strategy is effective. Short-term (few dialog turns) evaluation may show ability of the user to correct attention deficit and regain (mind) control. Long-term (days-weeks) evaluation may be used to determine user coachability and behavior improvement. Increasing user skills may lead to progressively more streamlined and infrequent dialog prompts by the system.

Embodiments disclosed herein may be designed for use in the car, but can be extended for use on mobile devices, home, work, or the like.

Embodiments disclosed herein may include methods for automated notification of changes in driving rules (e.g. speed limits, no turn on red signal, limited or no usage of cellphones or partial functions, . . . ) when crossing State boundaries. Communication may be verbal only; communication may be succinct, but requests for clarification from user may be handled by providing more exhaustive explanations, as needed. Change in local traffic regulations may be shared with driver monitoring system to encourage driving behavior consistent with the rules.

Embodiments disclosed herein may include methods for spatially located audio feedback using multiple speakers installed in a vehicle, and phase modulation across the available channels. Sound or voice of the system alerting the driver may be projected to come from the direction where the driver is requested to pay attention to (e.g. "Watch the car that stopped before you" or "Pay attention to the cyclist on your right)". Connection between the warning system and the audio subsystem may be performed using wireless (e.g. WiFi or Bluetooth) or wired (e.g. USB) links, and using surround-sound (e.g. Dolby®) modulation of the audio information. A result may be to quickly inform the driver where the danger or other item requiring driver attention is, without having to describe where it is as part of the message, to convey urgency effectively and timely. By extension, the same techniques may be used in a multi-speaker environment like home, using dedicated speakers of a surround-sound home theater system or a cluster of digital assistants (e.g. Google® Assistant, Amazon Alexa®) to project the source of the warning message.

Embodiments described herein may enable safer driving by providing real time feedback to the driver about potentially hazardous conditions to prevent accidents caused by inattentiveness or impaired health conditions. Holistic nature of data analysis in real time (driver face and eyes, health condition, telemetry, outside contextual data) may make such embodiments advantageously comprehensive. Modeling the highly dynamic and multiple dimensions context and providing accurate feedback in real time on recommended actions may require extensive data collection and ingenuity to create sophisticated algorithms to create and use personalized models to benefit the driver by keeping him/her safe. Biosensors may be part of the holistic data analysis. In addition to visual inputs from camera and telemetry data, Heart Rate Variability (HRV) and Galvanic Skin Response (GSR) may provide reliable information to determine driver stress and fatigue measured in multi-dimensional context. Embodiments described herein may provide an accurate evaluation of the driver's attention level compared to driving needs, the ability to recognize unusual driving behaviors, to adapt to driving style and skill, all with the convenience of an affordable mobile app.

Embodiments of systems and methods as described in this disclosure may save lives of drivers by observing and modeling their attention to prevent accidents caused by distraction and drowsiness. Embodiments may assist insurance companies in fairer distribution of insurance premiums by building driver profiles. Embodiments may assist ride sharing and rental companies with in-cabin and on the road safety monitoring devices by monitoring and modeling driver and passenger behavior. Embodiments may help fleet management companies efficiently manage their truck fleets by monitoring and modeling driver behavior and real time feedback. Embodiments may help parents of teenage drivers keep them safe and reduce their car insurance costs by monitoring their driving and application of virtual coaching. Embodiments may help keep driver and passenger data secure and up to the individual user to give permissions of use by controlling generation, maintenance and distribution of EDR per data owner's preferences and insurer's incentives. Embodiments may help with health monitoring of drivers to ensure their safety in the cabin and catch any emergency situations ahead of time. Embodiments may help with transition to self-driving vehicles to assist in smooth transfer of driving control from vehicle to driver and vice versa.

In short, the benefits of embodiments as described herein focus on saving lives. Embodiments may make driving safer, less expensive, and insurance rates fairer. Embodiments may introduce driving style and performance scoring. Embodiments may ensure a safe driving experience and liability protection. Embodiments may provide brand risk management and risk mitigation and ensures safety. Embodiments may keep teenage and beginner drivers alert. Embodiments may improves driving skills with Virtual Coach. Embodiments may keep driver and passenger data secure with opt-in technology whereby maintenance and distribution of EDR happens per data owner's preferences and insurer's incentives. Embodiments may monitor health conditions of drivers to detect emergencies, especially for the elderly and people with chronic health problems. Embodiments may make car-driver hand over in self driving vehicles tight and safe. Embodiments may provide effective and accurate evaluation of driving risk by evaluating driver's performance and attention against road and traffic conditions. Embodiments may generate advance warnings to the driver & feedback to the car insurance. Embodiments may also evaluate the response of a driver. By reducing the risk of accidents, embodiments may protect and induce good behavior of drivers and passengers.

Figure 13:
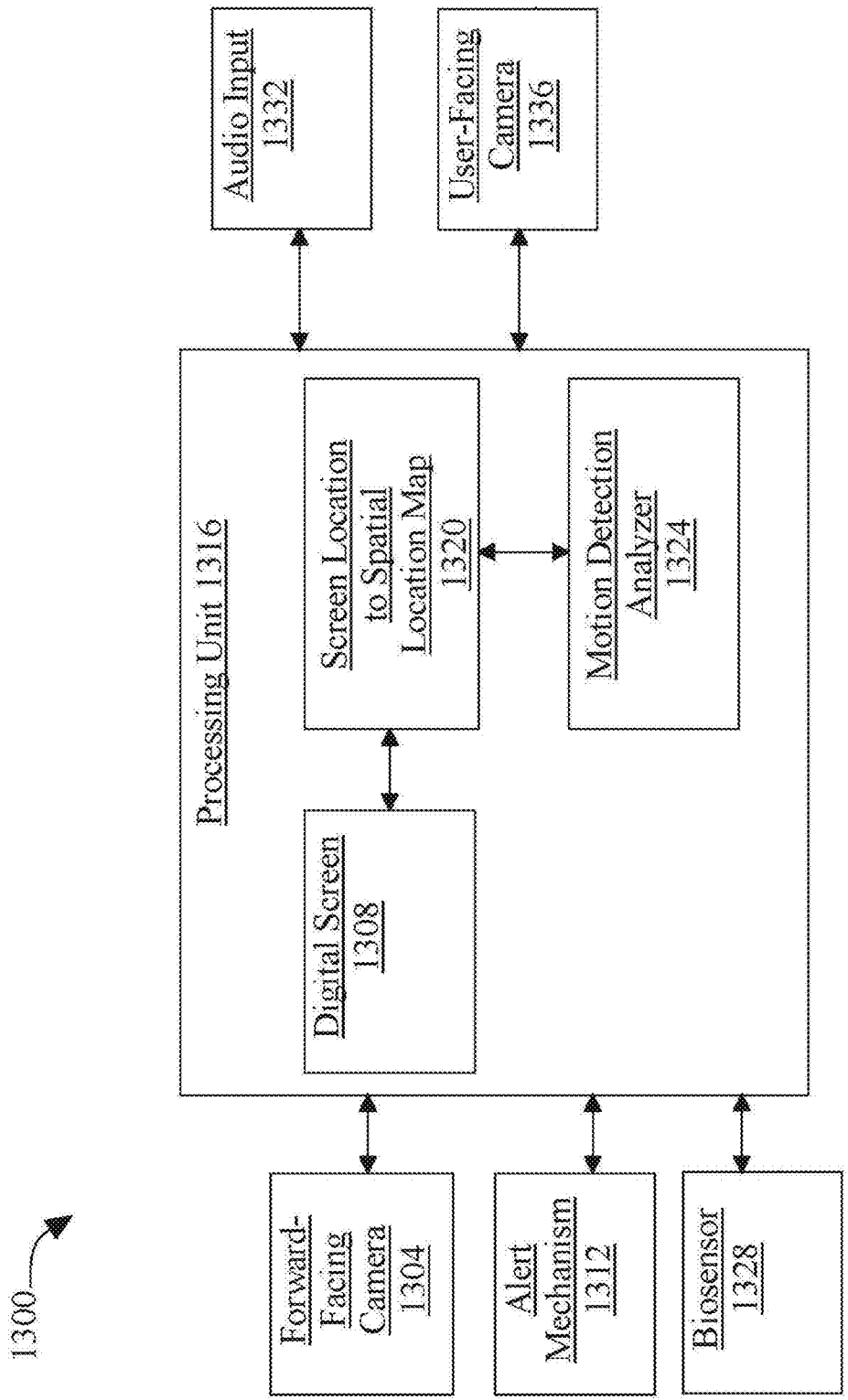
FIG. 13 is a block diagram showing an exemplary embodiment of a system for using artificial intelligence to evaluate, correct, and monitor user attentiveness.

Referring now to FIG. 13, an exemplary embodiment of a system 1300 for using artificial intelligence to evaluate, correct, and monitor user attentiveness is illustrated. System 1300 may be included in and/or include any system described above in reference to FIGS. 1-12. System 1300, and/or one or more elements thereof may be deployed in a vehicle as described above; alternatively or additionally, system 1300 may be implemented in a self-contained unit that may be carried by a user while walking, operating a vehicle, or performing other activities. In an embodiment, system may act to augment and/or simulate initial attention-direction processes performed by humans using visual information, such as without limitation detection apparent motion using peripheral vision and subsequent direction of focal gaze toward the detected apparent motion. Human brains have specific cells that focus on images captured by our eyes even unintentionally, to decide which aspects need bigger attention. System 1300 may act to detect apparent motion in a field of view, such as a field captured by a camera as described in this disclosure and may alert a user to the apparent motion. System 1300 may emulate peripheral vision detection by immediately notifying a user of detected apparent motion, by alerting the user prior to performing further steps such as object identification and/or classification, collision detection, and the like.

With continued reference to FIG. 13, system 1300 includes a forward-facing camera 1304. Forward-facing camera 1304, as used in this disclosure, is a camera oriented away from a user, such imagery captured by forward-facing camera 1304 represents conditions exterior to the user; forward-facing camera 1304 may be oriented in a current or likely future direction of travel of the user, including capturing a view ahead of a vehicle and/or behind a vehicle, and/or being held and/or mounted in front of a user who is standing, biking, and/or walking forward. Forward-facing camera 1304 may be implemented in any manner suitable for use as a camera and/or camera unit as described in this disclosure, including without limitation any camera included in a camera unit 403 as described in reference to FIG. 4, such as a front camera 4035 and/or rear camera 4031, a near IR camera as described above in reference to FIG. 5, a camera 705 as described above in reference to FIG. 7, a camera 807 as described above in reference to FIG. 8, a road-facing camera 1004 and/or rear-facing camera as described above in reference to FIG. 10, a forward facing camera 1149 as described above in reference to FIG. 11, and/or a road-facing camera 1209 as described above in reference to FIG. 12. Forward-facing camera 1304 may include a camera integrated into a mobile device such as a cellular phone and/or smartphone as described in further detail above.

Still referring to FIG. 13, forward-facing camera 1304 is configured to capture a video feed; a video feed may include any video feed and/or sequence of video data as described above in reference to FIGS. 1-12. In an embodiment, a video feed may include a series of samples or frames of light patterns captured by light-sensing and/or detection mechanisms of forward-facing camera 1304; series of frames and/or samples may be temporally ordered for sequential display, creating a simulation of continuous and/or sequential motion over time. Forward-facing camera 1304 is configured to capture video feed of a field of vision; field of vision as defined herein is a range within which forward-facing camera 1304 captures visual data, for instance and without limitation, a spatial range of objects light from which is focused onto light-sensing elements of forward-facing camera 1304 using lenses or other optical elements of forward-facing camera 1304. Forward-facing camera 1304 is configured to capture video feed on a digital screen 1308. A "digital screen 1308" as used in this disclosure is a data structure representing a two-dimensional spatial array of pixels representing individual units of optical data sensed using optical sensors in the camera. Each pixel may be linked to a corresponding set of two-dimensional coordinates, such as without limitation Cartesian coordinates.

Continuing to refer to FIG. 13, system 1300 includes at least a user alert mechanism 1312. At least a user alert mechanism 1312 is a device and/or component capable of generating a user-detectable signal, including without limitation a visible, audible, tactile, or otherwise sense-perceptible signal. At least an alert mechanism may include any mechanism suitable to signal to and/or engage attention of a user as described above in reference to FIGS. 1-12, including without limitation a speaker 328, any device used to produce sounds and/or voice prompts 321, phone 409 speakers, display, lights, and/or vibrators, a speakerphone such as speakerphone 703 or speakerphone 805, any device and/or component suitable for generating light color 1030, any device and/or component suitable for generating light color and pattern acoustic warning 1031, any device and/or component suitable for generating light color and pattern acoustic warning and pattern spoken alarm message 1032, any device and/or component suitable for performing dialog interaction with driver to restore attention 1028, a feedback multicolor LED ring 1142 or the like, a speaker 1145, a blue LED array 1146, blue light and/or color LEDs 1211, and/or a speaker array 1215. At least an alert mechanism may include, without limitation, make sure also includes headphones and/or a headset connected to a mobile device or other computing device. At least a user alert mechanism 1312 is configured to output a directional alert to a user. A directional alert may be any signal indicating to a user a direction in which the user should focus and/or to which the user should turn face or eye gaze, as described in this disclosure.

Still referring to FIG. 13, system 1300 includes a processing unit 1316; processing unit 1316 may include any computing device as described in this disclosure, including without limitation a processing unit 315 or the like. Processing unit 1316 is in communication with forward-facing camera 1304 and at least a user alert mechanism 1312; processing unit 1316 may communication with forward-facing camera 1304 and/or at least a user alert mechanism 1312 using any wired and/or wireless connection and/or communication protocol as described above in reference to FIGS. 1-12. Processing unit 1316 may be designed and/or configured to perform any method, method step, or sequence of method steps in any embodiment described in this disclosure, in any order and with any degree of repetition. For instance, processing unit 1316 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processing unit 1316 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 13, system 1300 includes a screen location to spatial location map 1320 operating on the processing unit 1316. A "screen location to spatial location map 1320" as defined in this disclosure is a data structure that directly links locations on a digital screen 1308 to locations in a field of view, permitting a system to retrieve a spatial location directly from a screen location to spatial location without any computer vision and/or classification tasks such as object identification, edge detection, or the like. Spatial location as used herein may be a location in three-dimensional space such as without limitation a location defined in a three-dimensional Cartesian coordinate system, a three-dimensional polar coordinate system, and/or using a vector in a three-dimensional vector space, a location in a projection of three dimensional space onto two dimensions, such as a two-dimensional Cartesian, polar, and/or vector-based coordinate system, and/or a three-dimensional vector direction, or the like. Data structure may include any structure useful for retrieving one datum using another, including without limitation hash tables, vector and/or array data structures, databases, key-value data stores, or the like. For instance, cell identifiers and/or pixel IDs may be used as keys and/or hashes with which spatial locations may be retrieved.

Still referring to FIG. 13, processing unit 1316 and/or forward-facing camera 1304 may divide digital screen 1308 into two or more sections or cells for the purposes of mapping screen locations to digital locations using screen location to digital location map 1320 and/or generation of alerts as described in further detail below. As a non-limiting example, processing unit 1316 and/or forward-facing camera 1304 may divide digital screen 1308 may be divided into a plurality of cells and/or bins representing regions of screen bordering each other, which may be rectangular, hexagonal, or any other tessellation of regions; each cell and/or bin may correspond to an identifier of a plurality of cell identifiers. A location of a modified pixel, for instance as detected according to processes described below, may be represented by a coordinate of such a pixel; alternatively or additional, a location of at least a pixel and/or a plurality of pixels may be represented by a cell and/or bin identifier.

Alternatively or additionally, and continuing to refer to FIG. 13, division of digital screen 1308 may include identification of one or more regions of interests within digital screen and division of digital screen into regions of interest. As a non-limiting example, a central section or portion of digital screen 1308, such as region having a polygonal, curved, and/or combined border, may be identified as a region of high importance, in which alerts are triggered more easily and/or with a higher degree of urgency and/or escalation; such a region of high importance may correspond, in a forward view, to an area and/or lane directly ahead of a user's vehicle. As a further non-limiting example, one or more regions of secondary importance may be identified, such as without limitation one or more regions on either side of a central region, which may correspond to lanes adjacent to a lane in which vehicle is operating; regions of secondary importance may have a higher threshold for triggering an alert, a lower and/or different degree of urgency and/or escalation, and/or different triggering and/or escalation criteria than a region of high importance. As an additional non-limiting example, one or more regions of low importance may be identified, such as without limitation one or more regions to the right and left periphery of the digital screen, which may correspond to objects along the roadside such as trees, buildings, pedestrians on sidewalks or the like; regions of low importance may have a higher threshold for triggering an alert, a lower and/or different degree of urgency and/or escalation, and/or different triggering and/or escalation criteria than a region of secondary importance, or may not generate alerts prior to object classification at all. Persons skilled in the art, upon reviewing the entirety of this disclosure, will appreciate that there may be multiple importance levels for regions and/or sections of digital screen 1308, and that regions having any particular importance level may be a single region or multiple regions, and/or may have any location in digital screen 1308 corresponding to a degree of importance for detection and/or alert in such regions.

With continued reference to FIG. 13, division of digital screen 1308 into sections or regions may be performed without reference to features detected in video feed, for instance by geometric division into central, near-central, and peripheral regions of view or the like based on typical, default, and/or assumed areas of differing levels of importance in the field of vision of the camera. Alternatively or additionally, processing unit 1316 and/or forward-facing camera 1304 may be configured to identify one or more features in the field of vision and divide the digital screen 1308 based on the identified one or more features. One or more features may include lanes, divisions between lanes, sides of a road or other right of way on which vehicle is traveling, or the like.

Still referring to FIG. 13, processing unit 1316 and/or forward-facing camera 1304 may be configured to calibrate processing unit 1316 and/or forward-facing camera 1304 to a position in vehicle to determine how forward-facing camera 1304 is positioned and/or oriented relative to the road. Calibration may be performed in conjunction with, during, and/or prior to any other method steps and/or procedures described in this disclosure. Calibration may be performed with respect to a vanishing point, for instance as set forth in further detail below; alternatively or additionally, calibration may be performed using one or more features in field of vision other than a vanishing point.

With continued reference to FIG. 13, processing unit 1316 and/or forward-facing camera 1304 may attempt to determine a vanishing point (VP) of a road on which vehicle is traveling to use as a reference. As used herein, a "vanishing point" is a location in a camera view where all parallel lines appear to converge; VP may be used to perform perspective transforms on the road. A VP also may define a horizon, allowing for the elimination of the sky during image processing. VP calculation may be performed according to one or more categories of calculation. As a non-limiting example, calculation of VP may be performed using edge detection. Edge detection methods may attempt to take advantage of high contrast edges in an image; such methods may be predicated on presence of predictable straight elements in the scene, such as lane markings or telephone lines. An alternative approach may use sliding windows and texture gradients in an image. A further approach may use Haar features in an image to determine the location of a road; this method may be similar to the popular methods currently used for face detection. In some embodiments, texture-based methods may tend to produce better results than simple edge methods, but may come with a computation burden.

Still referring to FIG. 13, a middle ground between edge and texture based methods may include using a region-based algorithm with a road region model, allowing for timely results on various road types; the method may use a triangle and/or trapezoidal model of a road's expected shape and position. Triangle and/or trapezoidal model may be used as a mask to determine an average RBG pixel value of the road; sing this RBG value, a custom saliency mapping of an image, such as an image captured from video feed, is produced that converts colors similar to the road's average color to 0. A remainder of the image may be scaled from 0 to 255 depending on its euclidean distance to the average road color, creating a grayscale saliency image; the road in the image may be black after normalization. A subsequent step may binarize the grayscale saliency image. Processing unit 1316 and/or forward-facing camera 1304 may take an Otsu threshold of the saliency image as well as a k-means clustering, where k=4; the Otsu threshold may produce a binary image, while a result of the k-means algorithm may produce a segmented image of four regions. Image may be binarized by converting all pixels that are part of the minimum mean cluster to 0; the rest of the image may be set to 1. To produce an image for a subsequent step, a logical "and" operation may be performed on results of k-means and Otsu algorithms. The above-described Otsu method may represent a liberal and quick method of determining a road region, while a k-means approach may represent a conservative and slower method; the k-means algorithm is the computationally intensive part of the segmentation. Speed of the k-means computation may be varied by modifying the number of iterations the algorithm runs for. It was determined experimentally that five iterations produced good results; it was further determined that, where higher speed and/or computational efficiency is desired two iterations may improve speed while maintaining an acceptable level of quality. Alternatively, processing unit 1316 and/or forward-facing camera 1304 may not perform a k-means algorithm; using only the Otsu method may work, but may overshoot the road considerably.

Figure 14:
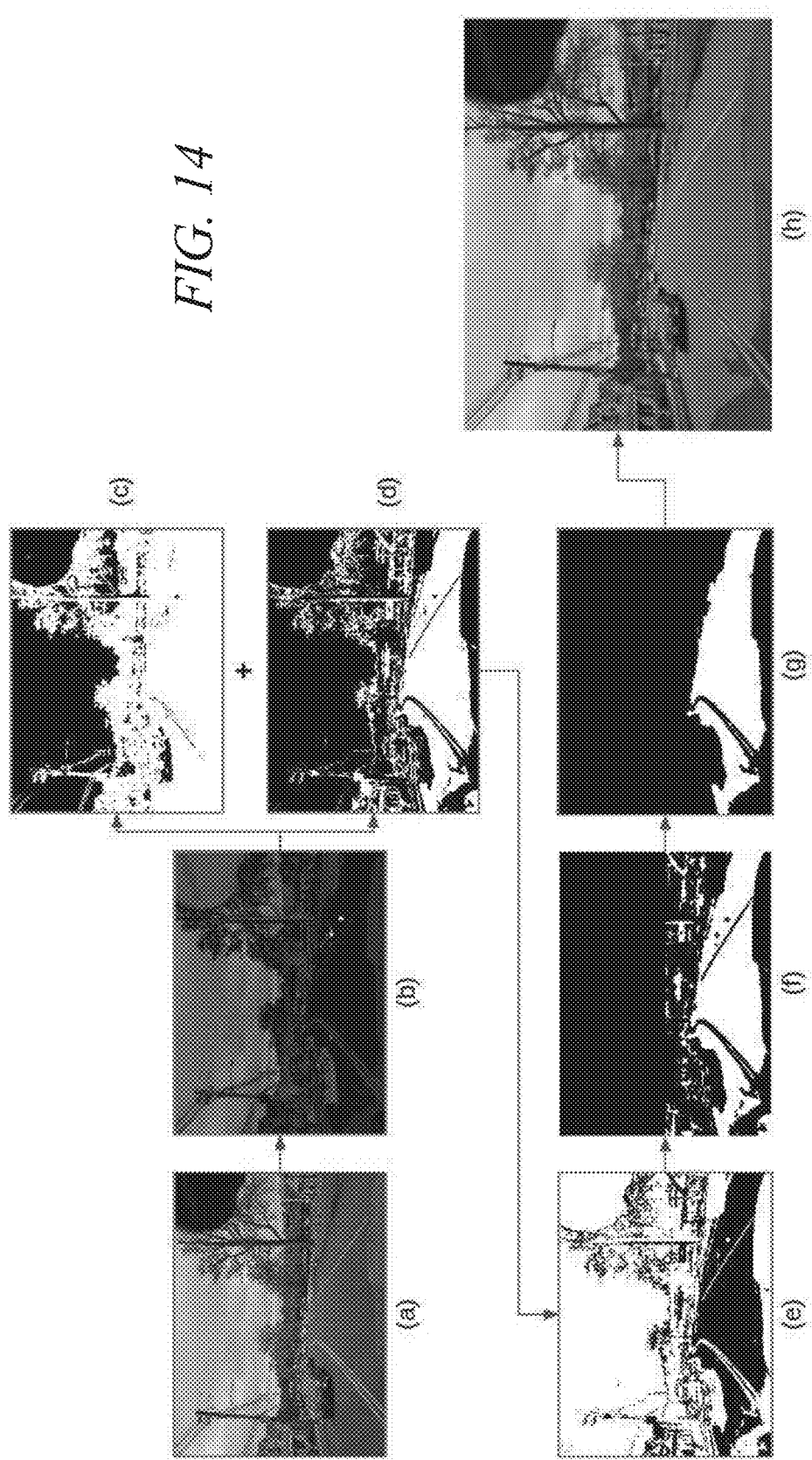
FIG. 14 is a flow diagram illustrating an exemplary embodiment of a series of image transformations that may be performed according to an embodiment.

With continued reference to FIG. 13, after binarization has been performed, for instance as described above, several binary morphological operations may be applied to combine disconnected road segments. Binary regions that lie in the lower half of the image and within a quarter of the width from the center may be considered road regions. A road segmentation process, for instance as shown in FIG. 14, may be produced. Due to the natural noise in the image, a simplification of the road region contour may be performed. Methods may include pre-processing the image with a Gaussian blur (5×5), post-processing the image with a polygon discretization algorithm such as without limitation a Ramer Douglas Peucker algorithm, such as without limitation the implementation of the Ramer Douglas Peucker algorithm provided in the OpenCV library, or producing a convex hull of the segmentation. Persons skilled in the art, upon reviewing the entirety of this disclosure, will be aware of various post-processing algorithms and/or protocols that may be used consistently with this disclosure.

Referring now to FIG. 14, an exemplary sequence of images as generated in a road segmentation process is illustrated. An original image (a) may be normalized, as described above, to create normalized image (b). An Otsu's threshold algorithm may generate a binarized image (c). Application of k-means segmentation to a binarized image may produce a modified binarized image (d). An inverted sup of Otsu and k-means methods may further modify the image (e). Morphological operations may produce a further modification (f) to the image. Significant counters may be extracted (g). The results of (a)-(g) may be overlaid on the original image (h).

Figure 15:
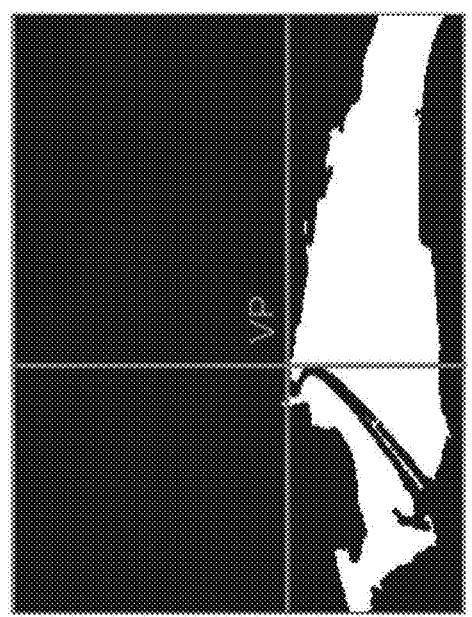
FIG. 15 is a diagram illustrating an exemplary embodiment of a vanishing point detection technique.

In an embodiment, and still referring to FIG. 14, a method for VP detection may incorporate Hough transforms along edges of a road segment as well as calculating texture gradients. As further illustrated in FIG. 15, an alternative approach may be developed: since a road segment algorithm produces a triangular shape towards the vanishing point, an x-axis coordinate of the VP may be taken to be the column position of the image that contains the greatest number of pixels representing the road. A y-axis coordinate of the VP may be chosen as a position of the first road-representing pixel starting from the top quarter of the image; since the VP is not expected to change greatly over the course of a trip, a calibration phase of several hundred frames may be used to determine an average position of a vanishing point. In an embodiment, having some sense of how the camera is positioned relative to the road is may aid in determining lane detection and objects of concern.

Referring again to FIG. 13, forward-facing camera 1304 and/or processing unit 1316 may identify one or more regions of interest, as described above, to isolate content directly ahead of the car as well as peripheral information in adjacent lanes. In an embodiment, a smaller ROI may allow for faster processing during collision detection. Forward-facing camera 1304 and/or processing unit 1316 may identify regions of interest using one or more objects detected in video feed; for instance, Forward-facing camera 1304 and/or processing unit 1316 may determine location of lane markings on the road; this may involve performance of a multi-step process that involves estimating the region of the road, estimating a vanishing point of the camera for instance as described above, and/or performing perspective transformations on the road region.

Still referring to FIG. 13, lane detection may be performed using any suitable method, including isolating lanes on a road in one or more pre-processing steps, then performing a perspective transform to create an aerial view of the road ahead. In an embodiment, further detection may be performed with the perspective shift. Lane detection methods may include, without limitation, color segmentation to pick out yellow and white lanes. Alternatively or additionally, a Canny threshold of the image may be taken, producing a detailed edge map of the scene. Canny edge map may capture more detail than necessary; thus, to remove noise from clutter, pot-holes, and other details, everything above the VP, which may be detected as described above, may be deleted. Furthermore, any information within the road region that was segmented as described above may be deleted as well. Any well painted lanes may be preserved as their color may differ enough from the road to not be captured during road segmentation. In an embodiment, a Canny threshold may only capture edges of the lanes. To improve robustness, an optional color segmentation scheme may be used, wherein image is converted to an HSV color space and pixels in a yellow and white range may be extracted. These color segmented regions may be added to a canny image as described above, for instance using a logical "or" operator.

With continued reference to FIG. 13, a perspective transform may be taken in relation to the VP, creating. This may create a bird's-eye view of image. In an embodiment, an aerial view may be easier to process using traditional image processing means. An x-axis projection histogram may be produced of a number of lane-representing pixels in the transformed view; local maxima in this histogram may be selected. A hard-coded constant that defines the minimum distance between lanes may be used to remove any local maxima that are too close together; this may eliminate the detection of multiple lanes from the same lane, for example by misidentifying pot-holes and/or or cracks in the middle of the road. A position of a local minimum may be saved and added to a rolling average of the lane's position. A fixed area around the local maxima in the perspective image may be cut out. All lane-representing pixels may be captured and stored in a limited queue data structure, which may automatically pop a first element from the front of the queue once the size of the queue exceeds a predefined limit; in an embodiment the limited queue may act as a means of preserving information across multiple frames.

Still referring to FIG. 13, for each lane region, the points in limited queue may be collected to use as data in a least mean squares algorithm. In an embodiment, least mean squares algorithm may be performed with one degree polynomials or line of best fit methodology to approximate lanes. Alternatively or additionally, second degree estimations may be utilized; second degree estimations may be able to capture curvature in lanes that that first degree cannot, but may take slightly longer and/or may be more computationally expensive to compute. The results were more influenced by noise than the first degree polynomials.

Figure 16:
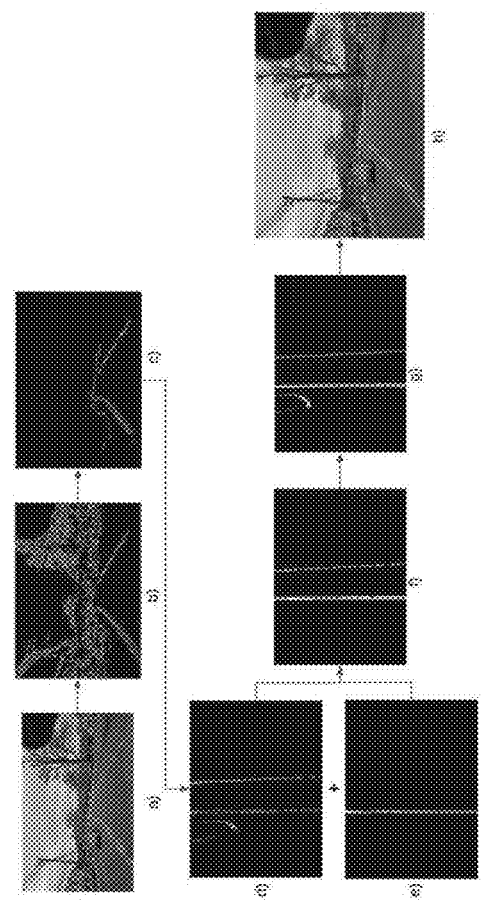
FIG. 16 is a flow diagram illustrating an exemplary embodiment of a method of edge detection.

Referring to FIG. 16, an exemplary embodiment of a process for finding lanes is illustrated. An original image (a) may be modified to a Canny edge image (b), which may have portions such as areas above the VP and the like removed to produce a masked Canny edge image (c). A perspective image of Canny lanes (d) may be produced, as well as a perspective image of color threshold image (e). The results of (d) and (e) may be combined to generate an image of edge lanes and color lanes (f). A second-order best fit lines process may be performed on lanes, as shown in (g). Computed transformed lanes from best fit lines of (g) are illustrated in (h). In an embodiment, method for lane detection as described above may be capable of finding multiple lanes. Ian embodiment, methods may be limited to detection of only two lanes closest to the VP and on opposite sides were used, limiting lane detection to lanes considered most relevant to detection of potential hazards and generation of directional alerts a described in further detail in this disclosure.

Referring again to FIG. 13, lane identification may be used to determine one or more areas of interest as described above. For instance, and without limitation, an area of digital screen 1308 covering a lane occupied by a vehicle containing forward-facing camera 1304, for instance as identified using the above-described methods, may be identified as a region of high importance, in which alerts are triggered more easily and/or with a higher degree of urgency and/or escalation; as a non-limiting example, such an area may be a substantially centrally located trapezoid on digital screen. As a further non-limiting example, one or more regions of secondary importance may be identified, such as without limitation one or more regions on either side of a central region that have been identified as depicting lanes adjacent to a lane in which vehicle is operating as described above; regions of secondary importance may have a higher threshold for triggering an alert, a lower and/or different degree of urgency and/or escalation, and/or different triggering and/or escalation criteria than a region of high importance. As an additional non-limiting example, one or more regions of low importance may be identified, such as without limitation one or more regions to the right and left periphery of the digital screen, regions corresponding to a portion of the digital screen that is above the vanishing point or the like, which may correspond to such objects as objects along the roadside such as trees, buildings, pedestrians on sidewalks, objects overhead, and/or any other objects that are unlikely to collide with the vehicle; regions of low importance may have a higher threshold for triggering an alert, a lower and/or different degree of urgency and/or escalation, and/or different triggering and/or escalation criteria than a region of secondary importance, or may not generate alerts prior to object classification at all.

Referring again to FIG. 13, system 1300 includes a motion detection analyzer 1324 operating on the processing unit 1316. Motion detection analyzer 1324 may include any hardware and/or software module or component. Motion detection analyzer 1324 is designed and configured to detect, on the digital screen 1308, a rapid parameter change, determine a screen location on the digital screen 1308 of the rapid parameter change, retrieve, from the screen location to spatial location map 1320, a spatial location based on the screen location, and, generate, using the spatial location, the directional alert, for instance and without limitation as described in further detail below.

With continued reference to FIG. 13, system 1300 may include any other element described in this disclosure as included in any system and/or used in any method. For instance, and without limitation, system 1300 may include one or more biosensor 1328s, which may include any biosensor 1328s as described above in reference to FIGS. 1-12, including without limitation GSR, HRV, breath, or other sensors. System 1300 may include at least an audio input device 1332, which may include any audio input device 1332 as described above in reference to FIGS. 1-12, including without limitation microphones. System may include at least a user-facing camera 1336, which may include any user-facing camera 1336 as described above in reference to FIGS. 1-12; user-facing camera 1336 may include a camera mounted to a mobile device such as a cellphone and/or smartphone, including without limitation a "selfie camera."

Figure 17:
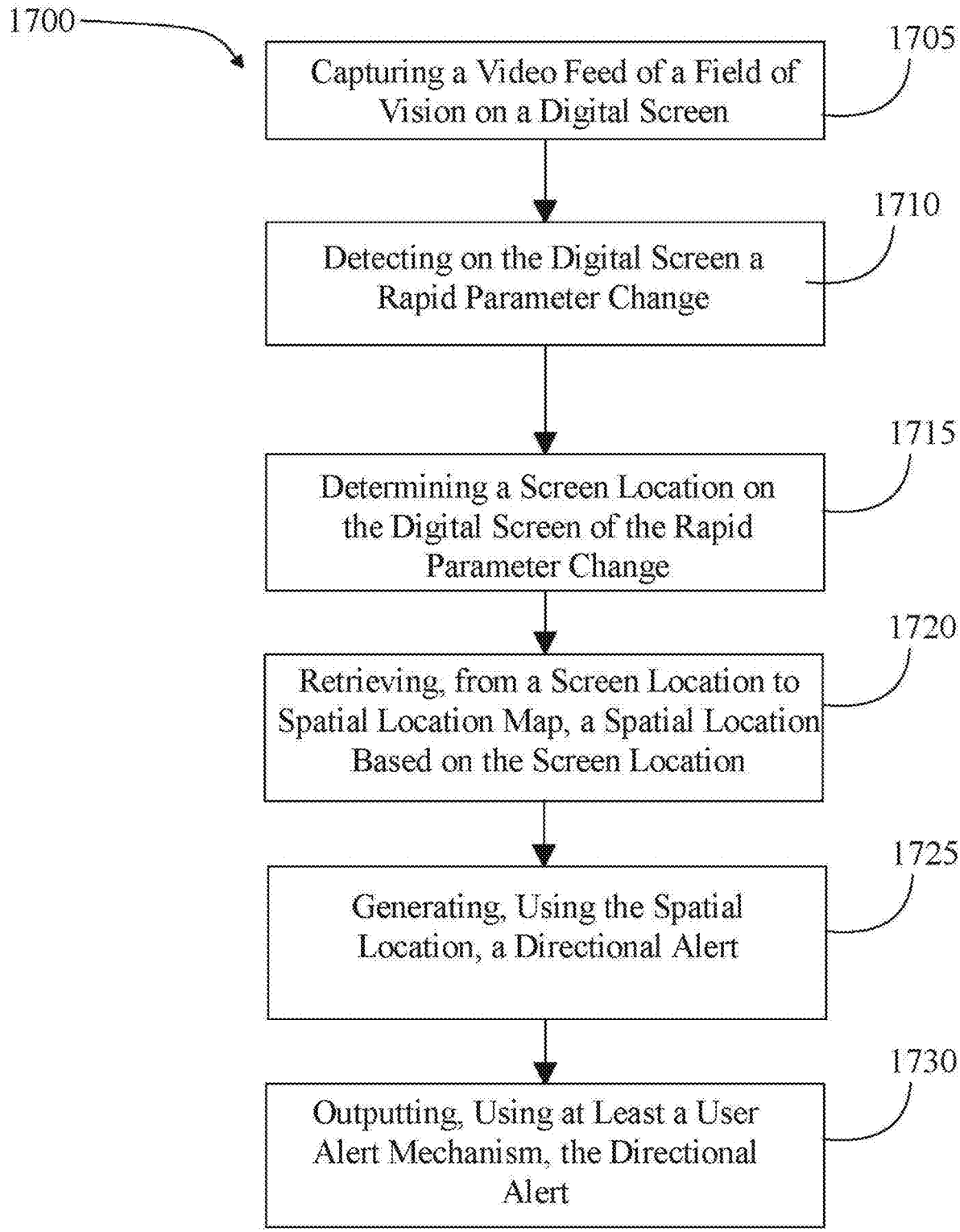
FIG. 17 is a flow diagram showing an exemplary embodiment of a method for using artificial intelligence to evaluate, correct, and monitor user attentiveness.
Figure 18:
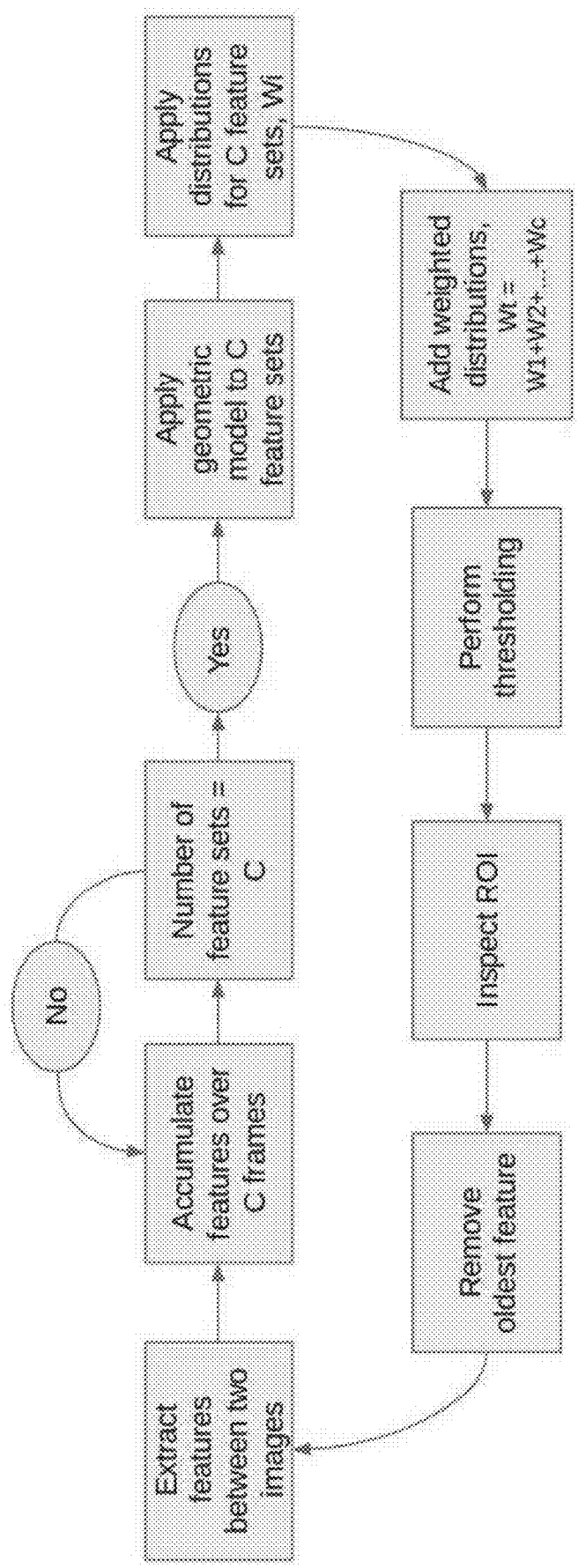
FIG. 18 is a flow diagram showing an exemplary embodiment of a process of feature detection and geometric detection of parameter changes.

Referring now to FIG. 17, an exemplary method 1700 of using artificial intelligence to evaluate, correct, and monitor user attentiveness is illustrated. At step 1705, a motion detection analyzer 1324 operating on a processing unit 1316 captures, using a forward-facing camera 1304, a video feed of a field of vision on a digital screen 1308; this may be implemented, without limitation, as described above in reference to FIGS. 1-13.

At step 1710, and continuing to refer to FIG. 17, motion detection analyzer 1324 detects, on the digital screen 1308, a rapid parameter change. A rapid parameter is a change in a parameter of one or more pixels that exceeds some threshold of number of pixels experiencing the change per unit of time and/or framerate. As a non-limiting example, detecting a rapid parameter change may include comparing a first frame of a video feed to a second frame of the video feed, and determining that a threshold number of pixels has changed with respect to at least a parameter from the first frame to the second frame. First and second frames may be consecutive, and/or may be separated by one or more intermediate frames. A frequency or sample rate with which motion detection analyzer 1324 samples frames may be selected to capture likely degrees of change reflecting motion of objects to which a user would be likely to need to respond; for instance, a sample rate may be set to sample frames frequently enough to detect parameter changes consistent with motion of vehicles, pedestrians, bicyclists, animals, or the like. Selection of frame rate may be determined using a machine-learning process; for instance, where object analysis and/or classification has been performed, as described above, to identify objects in similar video feeds, motion of such objects and rates of pixel parameter changes in video feeds may be correlated in training data derived from such video feeds, and used in any machine-learning, deep learning, and/or neural network process as described above to identify rates of pixel parameter change consistent with motion of classified objects. Such identified rates, in turn may be used to set a frame sample rate for motion detection analyzer 1324. Rates of change consistent with object motion may likewise be used to select a threshold degree of pixel changes, such as a threshold number of pixels with changed parameters, that may be used to detect rapid change as described above. In an embodiment, detection of rapid change may perform analogously to a human perception of movement and/or light change in peripheral vision that is sufficient for the human to glance in the direction of the perceived change. Use of threshold levels, as derived for instance using machine-learning, deep learning, and/or neural net processes as described above, may prevent small fluctuations in light or color from triggering alerts as described in further detail below, while causing fluctuations consistent with possible movement of objects of concern to be detected and used to generate directional alerts.

Still referring to FIG. 17, parameter changing in a rapid parameter change may include parameter that pixel might possess; parameters to track, and changes to detect in those parameters, may be determined using machine-learning processes, as described above, to detect correlations between parameter changes and motion of objects. As a non-limiting example, at least a parameter may include a color value. As a further non-limiting example, at least a parameter may include an intensity value. At least a parameter may include a combination of multiple parameters, such as without limitation a linear or other combination as derived using machine-learning, deep learning, and/or neural net processes as described above.

With continued reference to FIG. 17, parameters detected and/or compared for rapid parameter change may include parameters describing multiple pixels, such as parameters of geometric features of shapes on digital screen. For instance, processing unit 1316 may use feature detection between sequential frames to detect rapid parameter change. As a non-limiting example, features in a static camera may move along epipolar lines that intersect through the cameras epipolar center. By measuring the distance these features have moved, the distance these features are from the epicenter, and the time between frames, processing unit 1316 may determine that shape having a feature set is moving more than a threshold amount, and/or in a direction consistent with intersection of an object corresponding to the shape with the vehicle and/or a path traveled by vehicle. Modification of a shape on digital screen 1308 corresponding to intersection of an object with vehicle and/or a path of vehicle may be referred to herein as "collision detection," where collision detection refers to a change in two-dimensional parameters on digital screen 1308 that matches conditions for generation of a directional alert. Translational motion of a shape identified by feature identification may be tracked using a motion vector, which may include an n-tuple of values, stored in any suitable data structure and/or data representation, tracking motion of a shape in digital screen 1308. As a further example, a resizing vector, which may include an n-tuple of values, stored in any suitable data structure and/or data representation, tracking a change in size of a shape on digital screen 1308 may be maintained, updated by frame-to-frame comparisons, and/or compared to thresholds.

In an embodiment, and with continued reference to FIG. 17, a motion vector and/or resizing vector may be used to estimate time to collision TTC of an object based on a parameter change. One or more parameter changes may be used to calculate numbers indicative of degrees of change; processing unit 1316 may then weight features with scores corresponding to calculated numbers. An image region, such as a region of interest as described above and/or a region containing matching features, may then be divided into multiple squares and the median score of the features is used as the region's score. FIG. 6 illustrates a flow diagram describing an exemplary embodiment of a process flow for feature matching and detection of parameter changes.

Figure 19B:
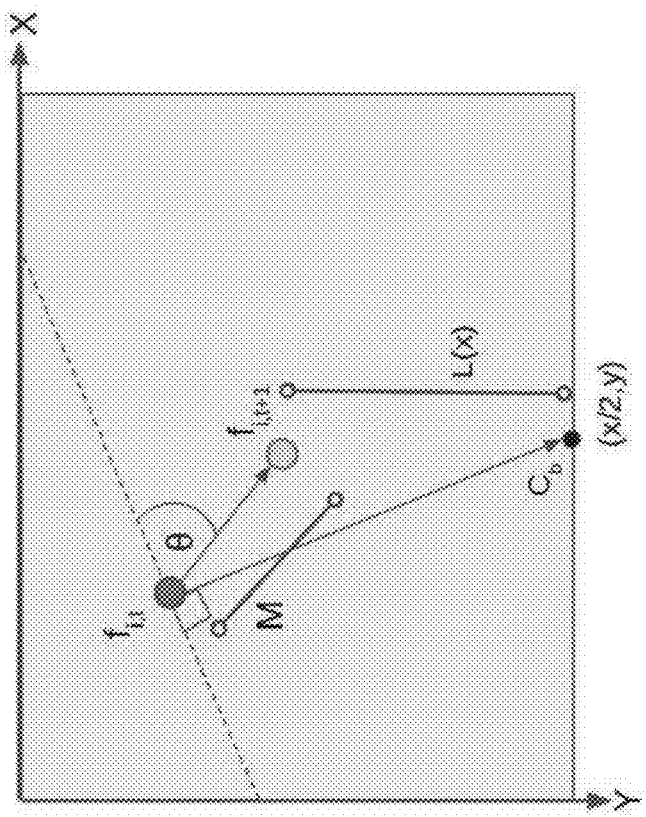
FIGS. 19A-B are schematic diagrams illustrating geometric models used to detect rapid parameter changes.
Figure 19A:
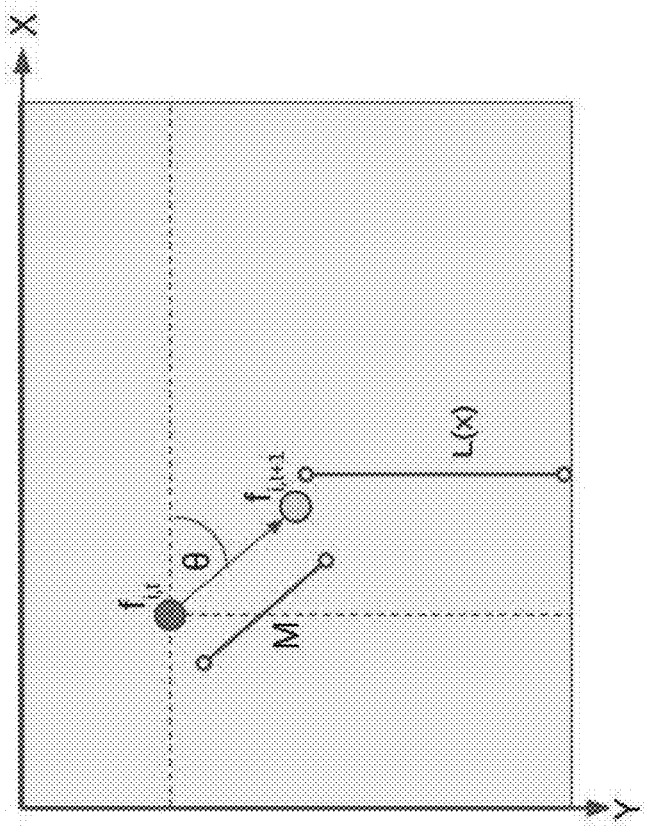

Still referring to FIG. 17, an alternative or additional approach may include defining a feature set as the set of matched features that are developed from two sequential frames, for instance as described above. Any feature extractor and matcher may be used. For example and without limitation a Binary Robust Invariant Scalable Keypoints (BRISK) detector and matcher may be used; this algorithm may depend on the inspection of a predefined number of feature sets, $n_s$. In an embodiment, for each set, features may be given weighted scores based on their motion along digital screen 1308, a magnitude of their motion, and their position relative to a bottom of the screen. Features' weighted scores may be determined, without limitation, using one or more geometric models as illustrated, for instance, in FIGS. 19A-B; both models may be expressed by the following equation:

$$W_i = \frac{|f_{i,t}, f_{i,t-1}|}{D_m} * (\sin(\theta) + L(f_{i,t})) * \frac{1}{2}$$

Where $f_{i,t}$ and $f_{i,t-1}$ are the coordinates of matched features in subsequent frames, $D_m$ is the maximum distance features can be separated by in the image, $\theta$ is the directional angle of the vector between $f_{i,t}$ and $f_{i,t-1}$, and $L(\ )$ produces a normalized score depending on the feature's proximity to the bottom of the image. $L(\ )$ can be implemented in several ways. One option used an exponential function of the y-axis coordinate of the feature. For faster computation, a linear function is used on the mobile application. The two geometric models differ in how $\theta$ is computed. The first model, shown in FIG. 19A, computes $\theta$ relative to the horizon. The more vertical a vector between the two features is, the closer the sin( ) function should be to one. Conceptually, features moving vertically down the screen may be given a greater weight. This model may further prioritize features moving towards the bottom center of the screen, indicative of a location proximal to the driver's seat. Purely looking for vertical objects may give considerable weight to oncoming adjacent objects, which are frequent and often innocuous. Using the alternative angle for $\theta$, as shown for instance in FIG. 19B. items move directly into the cars lane and car lanes are given higher weights. This new $\theta$ may be computed by finding the vector between $f_{i,t-1}$ and a center bottom point, $C_b$. The perpendicular vector of $f_{i,t-1}C_b$ may be found; $\theta$ may thus be found to be the minor angle between $f_{i,t}f_{i,t-1}$ and $f_{i,t-1}C_b$. In the case of the former method, all angles that go above the horizontal are excluded. In the latter method, all angles that go beyond the perpendicular vector may be excluded."

Figure 20:
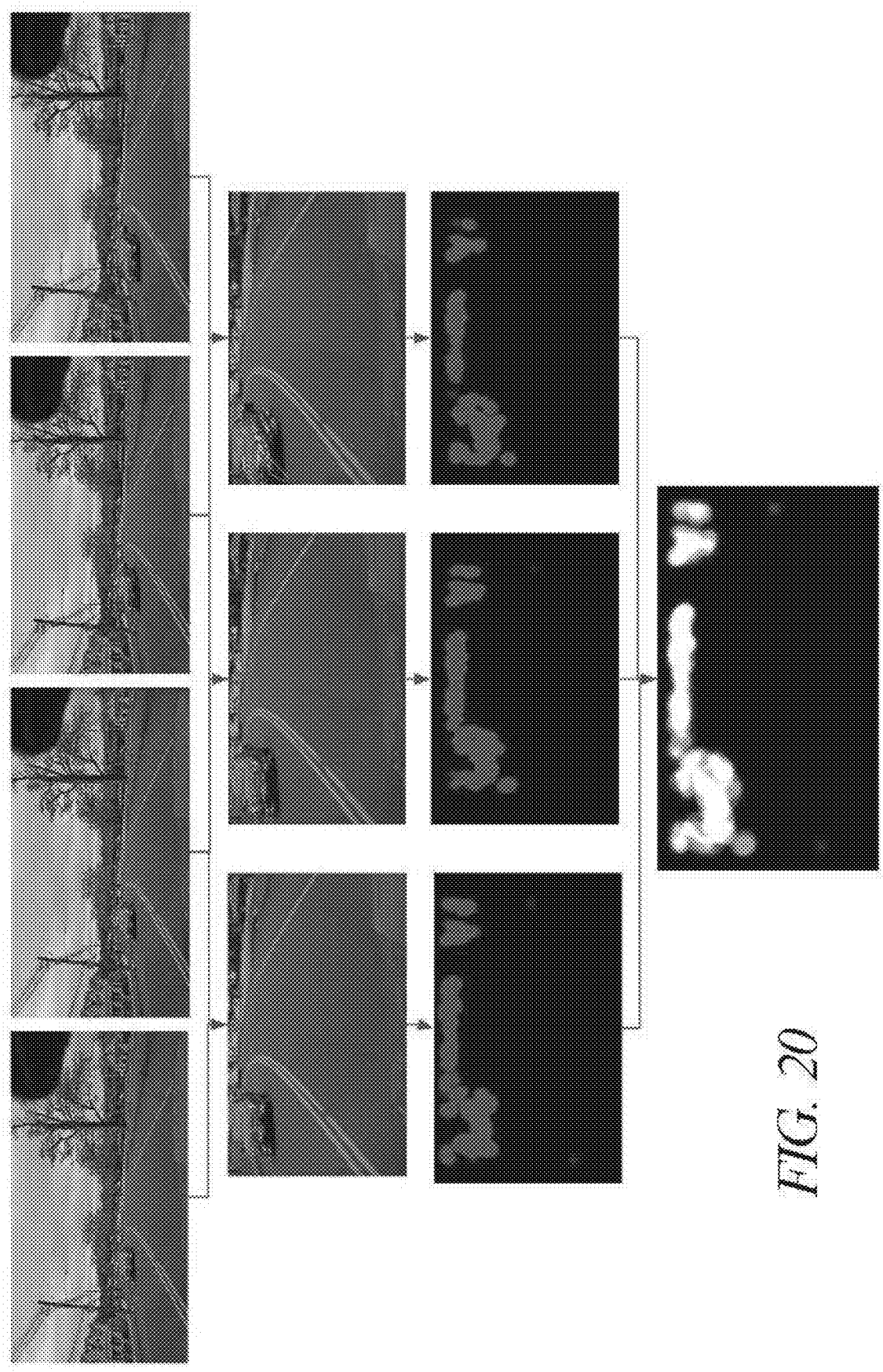
FIG. 20 is a schematic diagram illustrating an exemplary embodiment of a heat map.

Referring now to FIG. 20, for each pair of matched features, a two dimensional Gaussian kernel with a fixed variance may be placed at the location of $f_{i,t}$ on a blank image; the kernel may be originally comprised from values between 0 and 255. Kernel may then be divided by a number of feature sets being used and multiplied by the weight that was computed using the equation associated with FIGS. 19A-B above. This may be expressed in the following equation:

$$\Gamma(f_{i,t}) = \frac{G(x, y) * W_i}{n_s}$$

An image produced from a single feature set may then be expressed as:

$$h_i(x,y) = \Sigma_{n=1}^{i}(\Gamma f_{n,t}))$$

Then the heat map may be comprised of the sum of each feature set:

$$H(x,y) = \Sigma_{n=1}^{n_s} h_n$$

Figure 21:
FIG. 21 is a flow diagram illustrating an exemplary embodiment of a method for using artificial intelligence to evaluate, correct, and monitor user attentiveness.
Figure 21:

The heat map produces a grey scale image that ranges between 0 and 255. As a result, additional post processing may be performed for decision making to occur. As a non-limiting example a fractional method may be employed; fractional method may divide digital screen 1308 into three regions based on an identification of a lane containing the vehicle operated by the driver. The three regions may be defined as the left region, the lane region, and the right region, for instance as described above. A line between the top most and bottom most point of each detected lane may be used to divide the image. A pixel value sum of each region may be computed and divided by the highest possible score in the region. If this fraction passes a predefined threshold, the region is flagged as possibly containing an object. FIG. 21 is an exemplary illustration of a result of fractional method in an embodiment; in the image on the right, a guard rail causes a flag to be thrown and/or generation of a directional alert. Notably, a parameter change that triggers an alert and/or flag in one region of interest may not trigger the alert and/or flag in a differing region of interest.

Continuing to refer to FIG. 17, at step 1715 the motion detection analyzer 1324 determines a screen location on the digital screen 1308 of the rapid parameter change. In an embodiment, determining screen location may include identifying changing pixels according to a coordinate system as described above; identification may include, without limitation identifying coordinates of a boundary, geometric center, or the like of changed pixel area. Alternatively or additionally, determining screen location may include dividing the digital screen 1308 into a plurality of sections, regions of interest, and/or cells, for instance as described above, and identifying at least a cell and/or region of interest containing the rapid parameter change. A cell "contains" a rapid parameter change as used herein where the cell covers a portion of the digital screen 1308 where the rapid parameter change is occurring; in other words, a cell may "contain" the rapid parameter change where the cell contains at least a pixel undergoing the change. Identification may further include identifying a cell having a majority of changing pixels, a cell at a boundary and/or geometric center of a plurality of changing pixels, or the like.

At step 1720, and still referring to FIG. 17, motion detection analyzer 1324 may retrieve, from a screen location to spatial location map 1320, a spatial location based on the screen location. For instance, and without limitation, motion detection analyzer 1324 may submit screen location to screen location to spatial location map 1320 as a query, index value, hash-table key, or the like. Motion detection analyzer 1324 may store spatial location in a local variable and/or pass it to a subsequent function and/or module as an argument.

At step 1725, and with continued reference to FIG. 17, motion detection analyzer 1324 generates, using the spatial location, a directional alert. A directional alert may include any directional alert as described above; directional alert may inform a user of a direction in which to look and/or prompt the user to look in that direction. Direction may be relative to user body, relative to current user gaze, position and/or orientation of vehicle, or the like. Directional alert may include any directional data and/or output as described above, including words, direction from which sound and/or light emanating to cause user to look that way. Directional alert may simulate a direction using stereo sound manipulation in earphones or a headset of a user wearing such devices.

Continuing to view FIG. 17, motion detection analyzer 1324 may generate a directional alert only upon determining that user is not looking toward the motion and/or paying attention to the motion. For instance, and without limitation, generating may include determining a direction of user focus, calculating a spatial difference between the direction of user focus and the spatial location, and generating the directional alert as a function of the spatial difference. Spatial difference may include, without limitation, an angle between a vector from user to spatial location and a vector in a direction of current user eye gaze, as measured using cosine similarity or the like. In an embodiment, motion detection analyzer 1324 may continuously track user gaze direction, such that a current direction gaze, represented for instance and without limitation by a vector, may be constantly updated, and available for comparison to spatial location and/or a vector directed thereto from user. For instance where the user is looking down at the dashboard user's peripheral vision may not warn user of hazards along the road; system 1300 may emit a directional alert which is a sound above the user prompting the user to look up, and may alternatively or additionally generate an alert to one side or another of user, such as an alert prompting user to look to his or her left if user is looking to the right of detected motion.

Still referring to FIG. 17, generating a directional alert may include determination that a user's attention is focused on a particular item or element; for instance and without limitation, embodiments disclosed herein may include methods for evaluation of user attentiveness when listening to or watching a potential item of interest such as an advertisement message. Visual and audio analysis of user's reaction to the message may be used to rate pleasure/satisfaction/interest or lack thereof and confirm that the message has been received and understood, or not. In an embodiment, system 1300, any other system as described in this disclosure, and/or any computing device as described in this disclosure, may determine a degree of user interest in an item by determining an amount of time spent viewing the item of interest, including without limitation by determining that a user's gaze is on the item of interest and measuring time spent and/or proportion of time over a period during which user's gaze is so directed. Gaze tracking may more generally be used to determine degree of interest; for instance system 1300, any other system as described in this disclosure, and/or any computing device as described in this disclosure, may track eye movements to determine which areas of the side road advertisements or other items the driver is looking at and for how long. Similarly, this approach, or any method and/or method steps as described herein, may be used on mobile phones, using for instance a front-facing camera after verifying that the user looking at the screen/camera is a target of the evaluation. This may extend to a broader context of gaze tracking which results in an assessment of where the driver is looking, which in turn is used to trigger interaction with the car or an application as described in further detail below; in other words, gaze tracking may be used to understand the context of the human machine conversation.

Continuing to refer to FIG. 17, system 1300, any other system as described in this disclosure, and/or any computing device as described in this disclosure may determine degree of interest in a potential item of interest by measuring emotional arousal level, degree of engagement, or the like, using methods to determine distractedness and/or drowsiness from user-facing camera 1336s such as without limitation driver-facing cameras as described above, while user is viewing or otherwise being presented with potential item of interest. System 1300, any other system as described in this disclosure, and/or any computing device as described in this disclosure may determine degree of interest in a potential item of interest by emotional arousal level, degree of engagement, or the like, using methods to determine distractedness and/or drowsiness using biological signals such as GSR, HRV, or the like as described above, while user is viewing or otherwise being presented with potential item of interest. System 1300, any other system as described in this disclosure, and/or any computing device as described in this disclosure may determine degree of interest in a potential item of interest by determination of degree of interest using responses to dialog as described above, while user is viewing or otherwise being presented with potential item of interest, or with regard to dialog that is a part of potential item of interest.

Still referring to FIG. 17, system 1300, any other system as described in this disclosure, and/or any computing device as described in this disclosure may receive training data linking any measurement of any user parameter, including biological signals, images of user, and/or responses to dialog as described above, and degrees of attentiveness. Degree of attentiveness used for training data may include degree of attentiveness as determined using any method as described above including gaze tracking, time viewing item, degree of emotional arousal, or the like). Degree of attentiveness used for training data may include degree of attentiveness as rated by explicit user input, including verbal responses to dialog, evaluations entered in response to questionnaires, or the like. System 1300, any other system as described in this disclosure, and/or any computing device as described in this disclosure may use training data to determine a level of interest, including by generating a machine-learning model and/or output taking any of the above parameters measuring a user and outputting a degree of interest; machine-learning model and/or output may be combined with any other determination of degree of interest as described above, and/or used to predict whether and/or a degree to which a potential item of interest to be presented to a user will interest the user.

Continuing to refer to FIG. 17, system 1300, any other system as described in this disclosure, and/or any computing device as described in this disclosure may create training data correlating parameters and/or elements of items of potential interest to degrees of user interest, for instance by recording determinations as described above in combination with any parameters of item of interest, including subject matters, musical styles, images, categories of images of video content and/or items detecting within or without a vehicle or in user surrounding such as passing scenery, animals, people, buildings, other vehicles, or the like. System 1300, any other system as described in this disclosure, and/or any computing device as described in this disclosure may use such training data to generate a model and/or an output, using any deep learning, neural net learning and/or machine learning as described above, that predicts a degree of user input in a future or present item of potential interest. Any combination of above-described methods may be used; for instance, and without limitation, where degree of interest is represented by a value on a numerical scale, multiple determinations may be aggregated together using any suitable method for mathematical and/or statistical aggregation, including determining arithmetic and/or geometric means and/or application of a machine-learning, deep learning, and/or neural net model, using training data correlating sets of individual determinations to aggregate determinations, and applying any machine-learning, deep learning, and/or neural net methods as described above, mapping individual determinations to an aggregate determination.

With continued reference to FIG. 17, determination of user interest may be used to select and/or generate communication of interest to the user; communication of interest may include, without limitation, sounds, images, light patterns, dialog, or the like that keep user at, or help bring user to, an appropriate emotional arousal level as determined above. Communication of interest may include, without limitation sounds, images, light patterns, dialog, or the like that capture a user's attention generally and/or to cause user to look in a determined direction as described above. System 1300, any other system as described in this disclosure, and/or any computing device as described in this disclosure may use above determinations to aid in catching a user's attention by means of cessation of distracting output when directional alert or any other alert as described above is generated, to reduce the chance that user is distracted from such an alert. System 1300, any other system as described in this disclosure, and/or any computing device as described in this disclosure may use above-described methods for generation and/or provision of advertising content or the like to or for a user, by selecting such content to contain one or more items and/or elements in which user has a high degree of interest as determined above. System 1300, any other system as described in this disclosure, and/or any computing device as described in this disclosure may identification of items of interest in the area for user to look at and/or visit to improve user's arousal and/or drowsiness level, engage user interest, or for advertisement purposes.

Still referring to FIG. 17, above-described methods for determining a user degree of interest may be particularly useful in a contained environment like a car cabin (especially in a self-driving or autonomous vehicle) but may be extended for use at home or work, where one or more digital assistants have the ability to observe a user's response to ad messages. Embodiments may be used also on mobile phones, using the front-facing camera after verifying that the user looking at the screen/camera is the target of the evaluation. Visual and audio analysis of the user's reaction to the message may be used, by way of any methods, method steps, and/or combinations thereof as described above, to rate pleasure/satisfaction/interest level or lack thereof and/or to confirm whether a message has been received and/or understood. This may be particularly useful in a contained environment like a car cabin (especially in a self-driving or autonomous vehicle); alternatively or additionally, methods described above may be extended for use at home or work, where one or more digital assistants may have the ability to observe user's response to stimuli as described above, including without limitation advertisement content or the like. Methods as descried above may be used for evaluation of attentiveness of passengers in a vehicle, for instance to evaluate perceived interest of the passenger in objects seen through the windows, to create a profile of passenger preferences, for instance using aggregation and/or machine learning as described above, for system 1300, any other system as described in this disclosure, and/or any computing device as described in this disclosure to act on, for instance by providing information upon request, or cadenced with specific eye-catching items (for instance in the manner of a tourist guide), or as reminder when similar items, such as without limitation tourist attractions, storefronts, types of buildings, landscape patterns that may appear again later on.

Continuing to refer to FIG. 17, system 1300, any other system as described in this disclosure, and/or any computing device as described in this disclosure may use methods described above for determining a degree of user interest to determine that user is being distracted by any element as described above that is linked to user distraction. System 1300, any other system as described in this disclosure, and/or any computing device as described in this disclosure may select and/or create a degree of alert that may be higher if user appears to be focused on an item in which user has a higher degree of interest; this may be used for a determination of degree of distraction and/or for escalation to a more urgent or difficult to ignore alert as described above. Generating directional alert may include detecting a distracting input in a user environment and generating the directional alert as a function of the detection; for instance degree of alert, including more intense colors and/or louder noises, may be higher if user appears to be focused on something else; escalated alert as described above. Generating directional alert may include detecting an object of high user interest in a user environment and generating the directional alert as a function of the detection; degree of alert may for instance be higher if user appears to be focused on a distracting item, which may lead to an escalated alert, including more intense colors and/or louder noises, as described above. Generating directional alert may include determining a user attentiveness level and generating the alert as a function of the user attentiveness level; degree of alert may be higher if user appears to be focused on a distracting and/or interesting item, and an escalated alert as described above, including more intense colors and/or louder noises, may be generated. Timing, volume, and/or escalation may be based on any combination of factors relating to user response; for instance, and without limitation a combination of degree of attentiveness combined with user gaze direction and degree of responsiveness. For instance, a first score may measure degree of attentiveness, a second score may measure gaze diversion from direction of detected parameter change, and a third score may measure recent timeliness of user responses to alerts. Scores may be multiplied together, averaged together, or otherwise aggregated.

At step 1730, and still referring to FIG. 17, motion detection analyzer 1324 outputs directional alert using at least a user alert mechanism 1312. This may be implemented using any process described above for outputting noise, light, or other feedback directing a user to gaze in a particular direction. For instance, and without limitation, outputting the directional alert may include outputting a verbal indicator of direction, such as "look to your right," "look to your left," or the like. Alternatively or additionally, outputting directional alert may include outputting a spatial directional indicator, which may include any light and/or sound appearing to emanate from a direction to which user is supposed to turn, for instance as described above. Sound or voice of the system alerting the driver may be projected to come from the direction where the driver is requested to pay attention to (e.g. "Watch the car that stopped before you" or "Pay attention to the cyclist on your right)". A goal may be to quickly inform the driver where the potential danger is, without having to describe where it is as part of the message, to convey urgency in an effective and timely manner. By extension, such techniques may be used in a multi-speaker environment like home, using dedicated speakers of a surround-sound home theater system or a cluster of digital assistants (e.g. Google® Assistant, Amazon Alexa®) to project the source of the warning message.

Still referring to FIG. 17, above-described steps and/or processes may be combined with one or more steps and/or components as described above in reference to FIGS. 1-12. For instance, and without limitation, method 1700 may include performance of video feed analysis, risk analysis, collision detection and/or prediction, or the like, before, during, and/or after outputting directional alert. As a non-limiting example, motion detection analyzer 1324 or a component and/or device in communication therewith, may perform a risk analysis as described above in reference to FIGS. 1-12 after outputting directional alert; as a result, directional alert may rapidly inform user of motion that could be indicative of a hazard, while risk assessment may determine whether a risk such as a potential collision or the like is actually present and/or immanent, giving both user and system 1700 maximal time to respond to potential hazards. This may confer an unexpected advantage over systems that proceed from video feed to object detection and/or classification, and identification of hazards and/or user warnings based on object detection and/or classification, as detection and/or classification of objects necessarily requires more processing time than rapid directional determinations and initial alerts generated as disclosed above in method 1700.

Continuing to refer to FIG. 17, embodiments of method 1700 and/or steps therein may alternatively or additionally be used to enhance or augment methods for determining user attentiveness and/or risk assessment as described above. For instance, generation of directional alerts as described above may occur for many sub-critical and/or non-hazardous events such as detection of rapidly approaching vehicles and/or objects that are not on a collision course with a vehicle incorporating system 1300 and/or a user carrying system 1300. For each such directional alert, system 1300 may use gaze tracking as described above to determine how quickly a user responds to a directional alert. Multiple iterations of above-described method steps may collect multiple examples for speed of user response; system 1300 may determine from this an average or typical response time for a given user, who may be tracked using biometric identification including without limitation facial feature identification as described above. System 1300 may determine, with regard to a current directional alert, that user is slower to respond; this may be used, in turn, to determine that user is less attentive. Subsequent directional alerts may be escalated to be more noticeable as described above. System 1300 may further engage one or more communicative procedures as described above in reference to FIGS. 1-12 to raise user level of attentiveness. In an exemplary embodiment, directional alert may be a first alert, and a second alert may be generated as a function of a determined attentiveness level; user may have, for instance ignored first alert and/or responded to first alert more slowly, which may cause system 1300 to generate a second alert, which may be regarding the same detected change in the video feed, to catch the user's attention, for instance with a higher degree of escalation. Communication with user may also be given a higher degree of escalation, as described above in reference to FIGS. 1-12, due to a lower attentiveness level as determined based on user response to first alert.

Figure 22:
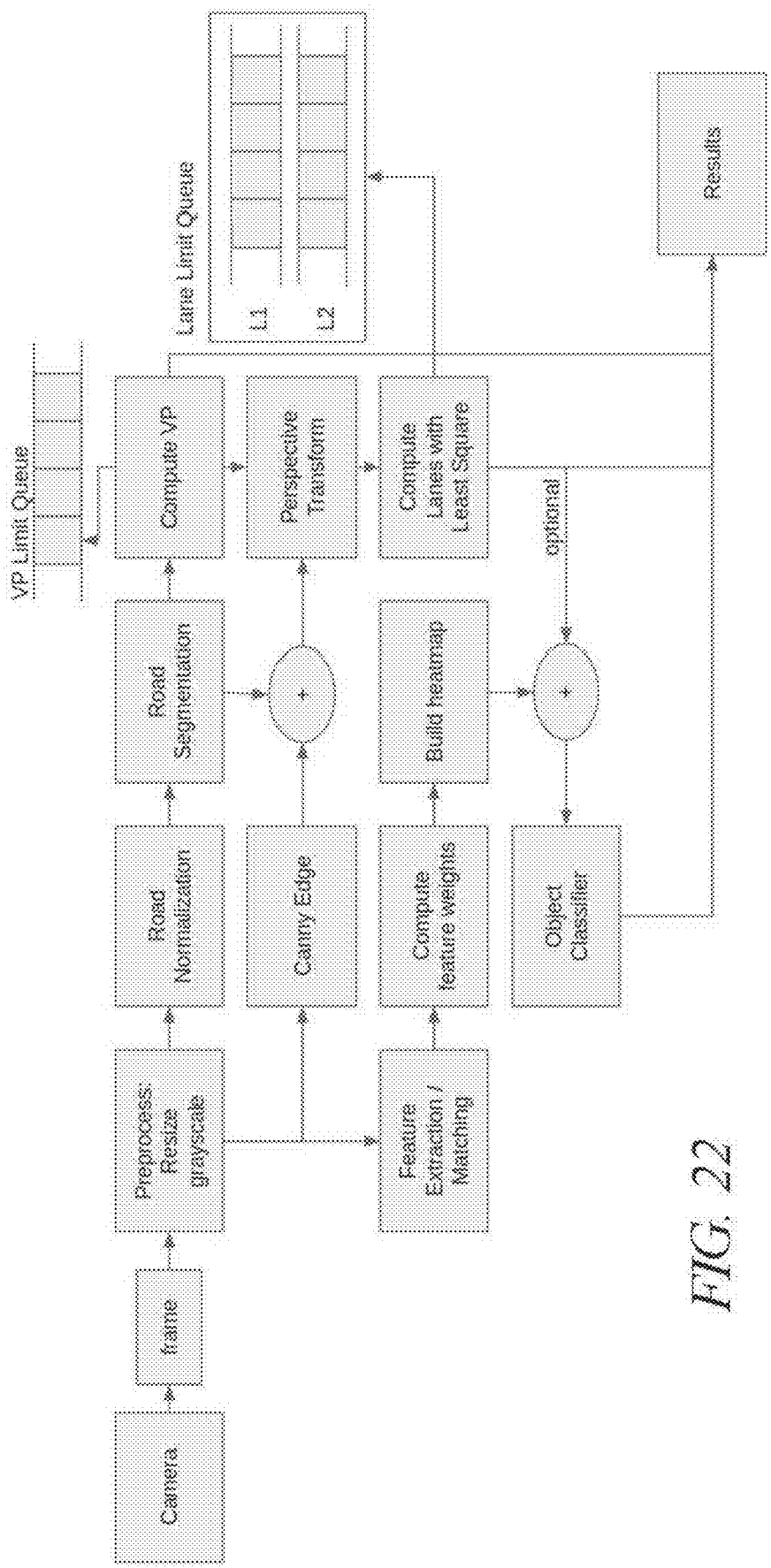
FIG. 22 is a schematic diagram illustrating an exemplary embodiment of object classification of image data.
Figure 23:
FIG. 23 is a flow diagram illustrating an exemplary embodiment of a method for using artificial intelligence to evaluate, correct, and monitor user attentiveness.
Figure 24:
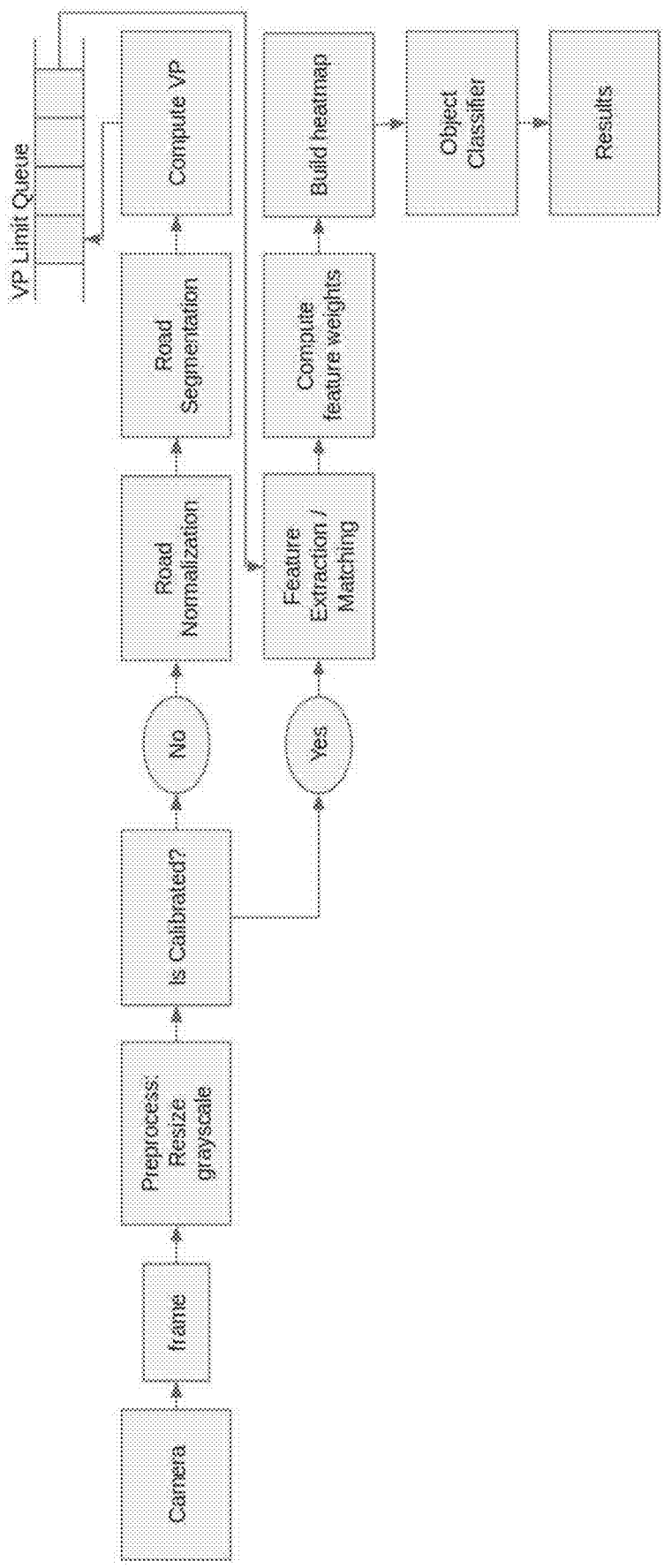
FIG. 24 is a flow diagram illustrating an exemplary embodiment of a method that minimizes impact of performance limitations of an artificial intelligence.

Referring now to FIG. 22, an exemplary flow chart illustrates a potential series of steps that system 1300 may perform in an embodiment; each step in FIG. 22 may be performed as described above. System may a location of lane markings on the road, for instance as described above. Determining the lanes on the road may provide the system at least a region of interest (ROI). ROI may be designed to isolate content directly ahead of the car as well as peripheral information in adjacent lanes. A smaller ROI may allow for faster processing during collision detection. Directional alerts may be generated to user based on detections of parameter changes and/or collision detection as described above. Collision detection routing may further isolate objects of motion in the image; these objects may then be passed through a classifier to be evaluated. Referring now to FIG. 23, a threshold method may classify objects from a heat map as described above. A threshold value is predefined, such as 165. A margin of error may be added. Further processing may be performed on the binarized blobs to filter certain aspect ratios and sizes. Bounding boxes of blobs may be generated and examined in the original image using a Haar Cascade, or any other suitable classifier. System may run on each individual frame using multi-threading to significantly improve response time. Certain processes, such as lane detection and road segmentation may be pipelined to run more efficiently. FIG. 24 illustrates an exemplary that minimizes impact of performance limitations; each step in FIG. 24 may be performed as described above.

Embodiments of method 1700 and system 1300 as described above may confer various significant and/or unexpected advantages. For instance, and without limitation, embodiments disclosed herein may help distracted people, people suffering from reduced and/or impaired peripheral vision, such as from aging, retinitis pigmentosa or the like to direct their attention to potential hazards or occurrences by augmenting perception. Where embodiments of system 1300 are deployed in vehicles, such embodiments may aid in accident avoidance and/or prevention. Where embodiments are implemented using a smartphone, embodiments may aid in alleviation of problems caused by "distracted walking" while viewing items on a smartphone or the like; a camera of a phone a user is looking at may continuously input a video feed that system 1300 may check for potential hazards, alerting a user to a possibility that he or she is about to walk into traffic, a stationary hazard such as a hole, a lamppost or body of water, or that he or she is about to be collided with by a mobile person, vehicle, animal, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 25:
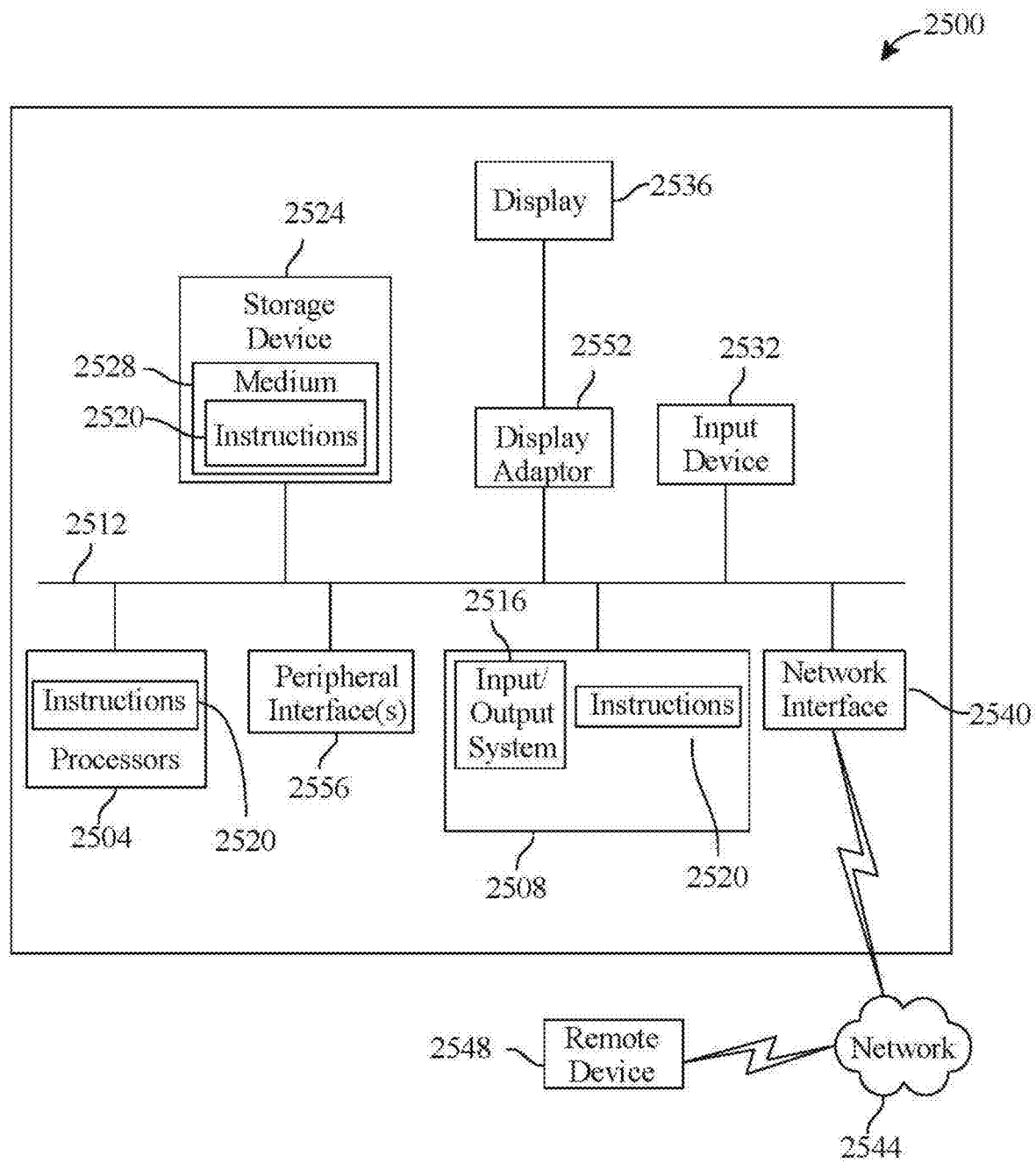
FIG. 25 is a block diagram of a computing system that can be used to implement any one or more of the methodologies disclosed herein and any one or more portions thereof.

FIG. 25 shows a diagrammatic representation of one embodiment of a computing device in the exemplary form of a computer system 2500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2500 includes a processor 2504 and a memory 2508 that communicate with each other, and with other components, via a bus 2512. Bus 2512 may include any of several types of bus structures including, but not limited to, a memory bus, a memory controller, a peripheral bus, a local bus, and any combinations thereof, using any of a variety of bus architectures.

Memory 2508 may include various components (e.g., machine-readable media) including, but not limited to, a random-access memory component, a read only component, and any combinations thereof. In one example, a basic input/output system 2516 (BIOS), including basic routines that help to transfer information between elements within computer system 2500, such as during start-up, may be stored in memory 2508. Memory 2508 may also include (e.g., stored on one or more machine-readable media) instructions (e.g., software) 2520 embodying any one or more of the aspects and/or methodologies of the present disclosure. In another example, memory 2508 may further include any number of program modules including, but not limited to, an operating system, one or more application programs, other program modules, program data, and any combinations thereof.

Computer system 2500 may also include a storage device 2524. Examples of a storage device (e.g., storage device 2524) include, but are not limited to, a hard disk drive, a magnetic disk drive, an optical disc drive in combination with an optical medium, a solid-state memory device, and any combinations thereof. Storage device 2524 may be connected to bus 2512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2524 (or one or more components thereof) may be removably interfaced with computer system 2500 (e.g., via an external port connector (not shown)). Particularly, storage device 2524 and an associated machine-readable medium 2528 may provide nonvolatile and/or volatile storage of machine-readable instructions, data structures, program modules, and/or other data for computer system 2500. In one example, software 2520 may reside, completely or partially, within machine-readable medium 2528. In another example, software 2520 may reside, completely or partially, within processor 2504.

Computer system 2500 may also include an input device 2532. In one example, a user of computer system 2500 may enter commands and/or other information into computer system 2500 via input device 2532. Examples of an input device 2532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2532 may be interfaced to bus 2512 via any of a variety of interfaces (not shown) including, but not limited to, a serial interface, a parallel interface, a game port, a USB interface, a FIREWIRE interface, a direct interface to bus 2512, and any combinations thereof. Input device 2532 may include a touch screen interface that may be a part of or separate from display 2536, discussed further below. Input device 2532 may be utilized as a user selection device for selecting one or more graphical representations in a graphical interface as described above.

A user may also input commands and/or other information to computer system 2500 via storage device 2524 (e.g., a removable disk drive, a flash drive, etc.) and/or network interface device 2540. A network interface device, such as network interface device 2540, may be utilized for connecting computer system 2500 to one or more of a variety of networks, such as network 2544, and one or more remote devices 2548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2544, may employ a wired and/or a wireless mode of communication. In general, any network topology may be used. Information (e.g., data, software 2520, etc.) may be communicated to and/or from computer system 2500 via network interface device 2540.

Computer system 2500 may further include a video display adapter 2552 for communicating a displayable image to a display device, such as display device 2536. Examples of a display device include, but are not limited to, a liquid crystal display (LCD), a cathode ray tube (CRT), a plasma display, a light emitting diode (LED) display, and any combinations thereof. Display adapter 2552 and display device 2536 may be utilized in combination with processor 2504 to provide graphical representations of aspects of the present disclosure. In addition to a display device, computer system 2500 may include one or more other peripheral output devices including, but not limited to, an audio speaker, a printer, and any combinations thereof. Such peripheral output devices may be connected to bus 2512 via a peripheral interface 2556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for using artificial intelligence to evaluate, correct, and monitor user attentiveness, the system comprising:
   a forward-facing camera, the forward-facing camera configured to capture a video feed of a field of vision on a digital screen;
   at least a user alert mechanism configured to output a directional alert to a user;
   a processing unit in communication with the forward-facing camera and the at least a user alert mechanism;
   a screen location to spatial location map operating on the processing unit; and
   a motion detection analyzer operating on the processing unit, the motion detection analyzer designed and configured to:
     detect, on the digital screen, a rapid parameter change;
     determine a screen location on the digital screen of the rapid parameter change;
     retrieve, from the screen location to spatial location map, a spatial location based on the screen location;
     determine a degree of interest as a function of a user parameter; and
     generate, using the spatial location and the degree of interest, the directional alert, wherein the directional alert comprises a communication of interest.

2. The system of claim 1, wherein the motion detection analyzer is further configured to detect the rapid parameter change by:
   comparing a first frame of the video feed to a second frame of the video feed; and
   determining that a number of pixels exceeding a threshold amount has changed with respect to at least a parameter from the first frame to the second frame.

3. The system of claim 2, wherein the at least a parameter includes a color value.

4. The system of claim 2, wherein the at least a parameter includes an intensity value.

5. The system of claim 1, wherein the motion detection analyzer is further configured to determine the screen location by:
   dividing the digital screen into a plurality of sections; and
   identifying at least a section of the plurality of sections containing the rapid parameter change.

6. The system of claim 1, wherein the motion detection analyzer is further configured to generate the directional alert by:
   determining a direction of user focus;
   calculating a spatial difference between the direction of user focus and the spatial location; and
   generating the directional alert as a function of the spatial difference.

7. The system of claim 1, wherein the motion detection analyzer is further configured to generate the directional alert by:
   determining a user attentiveness level; and
   generating the directional alert as a function of the user attentiveness level.

8. The system of claim 1, wherein outputting the directional alert further comprises outputting a verbal indicator of direction.

9. The system of claim 1, wherein outputting the directional alert further comprises outputting a spatial directional indicator.

10. The system of claim 1, wherein the motion detection analyzer is further configured to:
    determine how quickly user responds to the directional alert; and
    determine an attentiveness level of the user as a function of response.

11. A method of using artificial intelligence to evaluate, correct, and monitor user attentiveness, the method comprising:
    capturing, by a motion detection analyzer operating on a processing unit, using a forward-facing camera, a video feed of a field of vision on a digital screen;
    detecting, by the motion detection analyzer and on the digital screen, a rapid parameter change;
    determining, by the motion detection analyzer, a screen location on the digital screen of the rapid parameter change;
    retrieving, by the motion detection analyzer and from a screen location to spatial location map, a spatial location based on the screen location;
    determining, by the motion detection analyzer, a degree of interest as a function of a user parameter; and
    generating, by the motion detection analyzer and using the spatial location and the degree of interest, a directional alert; and
    outputting, by the motion detection analyzer and using at least a user alert mechanism the directional alert, wherein the directional alert comprises a communication of interest.

12. The method of claim 11, wherein detecting the rapid parameter change further comprises
    comparing a first frame of the video feed to a second frame of the video feed; and
    determining that a number of pixels exceeding a threshold amount has changed with respect to at least a parameter from the first frame to the second frame.

13. The method of claim 12, wherein the at least a parameter includes a color value.

14. The method of claim 12, wherein the at least a parameter includes an intensity value.

15. The method of claim 11, wherein determining the screen location further comprises:
    dividing the digital screen into a plurality of cells; and identifying at least a cell containing the rapid parameter change.

16. The method of claim 11, wherein generating the directional alert further comprises:
   determining a direction of user focus;
   calculating a spatial difference between the direction of user focus and the spatial location; and
   generating the directional alert as a function of the spatial difference.

17. The method of claim 11, wherein generating the directional alert further comprises:
   determining a user attentiveness level; and
   generating the directional alert as a function of the user attentiveness level.

18. The method of claim 11, wherein outputting the directional alert further comprises outputting a verbal indicator of direction.

19. The method of claim 11, wherein outputting the directional alert further comprises outputting a spatial directional indicator.

20. The method of claim 11, further comprises:
   determine how quickly user responds to the directional alert; and
   determine an attentiveness level of the user as a function of response.

* * * * *